(12) United States Patent
Kondo et al.

(10) Patent No.: US 7,688,891 B2
(45) Date of Patent: *Mar. 30, 2010

(54) IMAGE DATA COMPRESSION DEVICE, ENCODER, ELECTRONIC APPARATUS, AND METHOD OF COMPRESSING IMAGE DATA

(75) Inventors: Yoshimasa Kondo, Nagano (JP); Kyoichi Osada, Yamanashi (JP)

(73) Assignee: Seiko Epson Corporation (JP)

( * ) Notice: Subject to any disclaimer, the term of this patent is extended or adjusted under 35 U.S.C. 154(b) by 1357 days.

This patent is subject to a terminal disclaimer.

(21) Appl. No.: 11/124,809

(22) Filed: May 9, 2005

(65) Prior Publication Data

US 2005/0249279 A1    Nov. 10, 2005

(30) Foreign Application Priority Data

May 10, 2004    (JP) .............................. 2004-139755

(51) Int. Cl.
    *H04N 7/12* (2006.01)
(52) U.S. Cl. ............. 375/240.03; 375/240; 375/240.01; 375/240.02; 375/240.12
(58) Field of Classification Search ................ 375/240, 375/240.01, 240.02, 240.03, 240.12
    See application file for complete search history.

(56) References Cited

U.S. PATENT DOCUMENTS 6,111,913 A * 8/2000 Murdock et al. ....... 375/240.03

FOREIGN PATENT DOCUMENTS

| JP | 07-023385 | 1/1995 |
| JP | 07-312752 | 11/1995 |
| JP | 11-122623 | 4/1999 |
| JP | 2000-041240 | 2/2000 |

OTHER PUBLICATIONS

Tsuneo Okubo, et al., "A Hardware/Software Co-design for real-time MPEG2 LSIs", NTT 1997, pp. 609-614.
MPEG-4 Visual Part (Recommendations ISO/IEC 14496-2:1999(E) Annex L), pp. 311-321.

* cited by examiner

*Primary Examiner*—Allen Wong
(74) *Attorney, Agent, or Firm*—Harness, Dickey & Pierce, P.L.C.

(57) ABSTRACT

An image data compression device comprises a quantizing section for quantizing image data with a quantization step changing in accordance with a quantization parameter, a FIFO buffer section for buffering the quantized data corresponding to a plurality of frames, an encoded data generating section for generating encoded data obtained by encoding the quantized data retrieved from the FIFO buffer section asynchronously with writing thereto, and a rate control section for controlling a data size of the encoded data by changing the quantization step. The rate control section finds a predicted data size of the encoded data of the precedent frame from the size of the quantized data of the precedent frame, and sets or releases an upper limit threshold of the quantization parameter based on the number of assignable bits assignable to a compressing process or the number of remaining frames. When setting the upper limit threshold of the quantization parameter, the quantization parameter is found so as to be equal to or less than the upper limit threshold of the quantization parameter using the predicted data size.

21 Claims, 28 Drawing Sheets

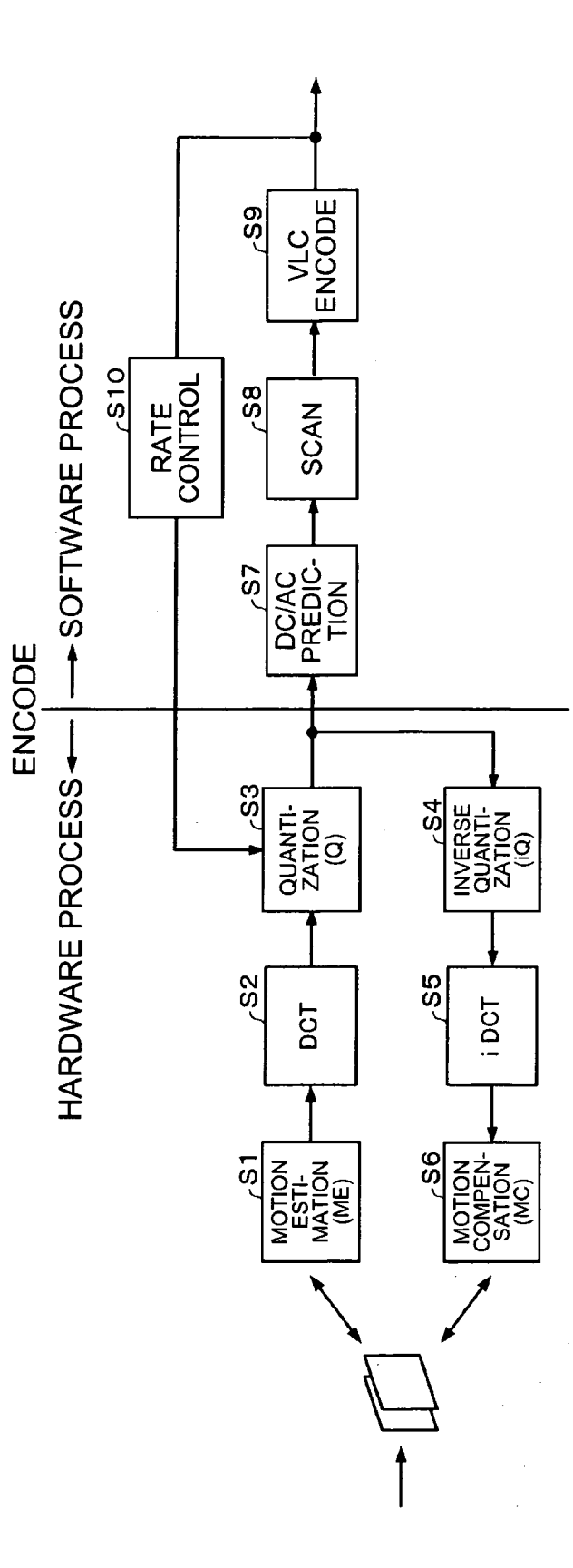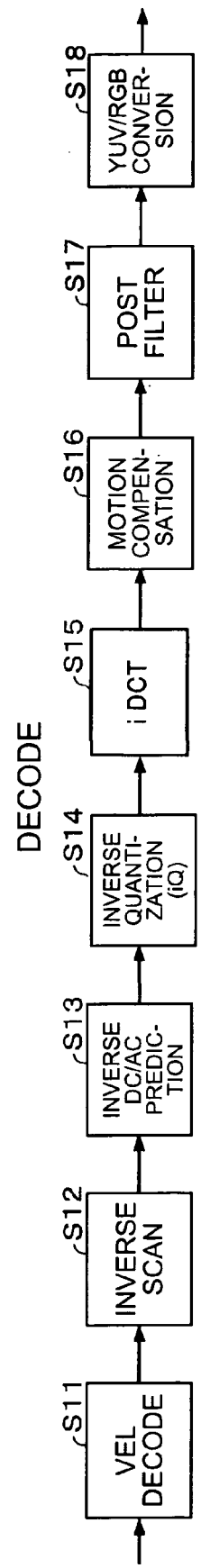

QUANTIZED DCT COEFFICIENT

| 28 | 22 | 8  | 2  | 1 | 0 | 0 | 0 |
|----|----|----|----|---|---|---|---|
| 7  | -6 | -2 | -1 | 0 | 0 | 0 | 0 |
| -1 | 1  | -2 | 0  | 0 | 0 | 0 | 0 |
| 3  | -1 | 1  | 0  | 0 | 0 | 0 | 0 |
| -1 | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |
| 0  | 0  | 0  | 0  | 0 | 0 | 0 | 0 |

FIG. 5

$$R = X_1 Ec \frac{1}{Qc} + X_2 Ec \frac{1}{Qc^2}$$

$$Ec = \begin{cases} \sum \frac{|x'_{ij}|}{A} & \text{(INTERCODED MACROBLOCK)} \\ \sum \frac{|x_{ij} - \mu|}{A} & \text{(INTRACODED MACROBLOCK)} \end{cases}$$

$$\left( \text{WHERE } \mu = \sum \frac{|x_{ij}|}{A} \right)$$

FIG. 6

| VARIABLES | MEANINGS |
|---|---|
| Rs | BIT RATE |
| Rc | NUMBER OF BITS USED FOR ENCODING PRESENT FRAME |
| Rp | AVERAGE NUMBER OF BITS GENERATED FOR EACH FRAME |
| Ec | AVERAGE OF ABSOLUTE VALUE OF PRESENT FRAME DATA |
| Qc | QUANTIZATION PARAMETER OF PRESENT FRAME |
| Qp | QUANTIZATION PARAMETER OF PRECEDENT FRAME |
| Nr | NUMBER OF REMAINING FRAMES TO BE ENCODED |
| Rr | NUMBER OF REMAINING USABLE BITS |
| T | NUMBER OF BITS TO BE ASSIGNED TO PRESENT FRAME |
| S | NUMBER OF BITS USED IN PRECEDENT FRAME |
| Hp | NUMBER OF BITS USED IN PRECEDENT FRAME OTHER THAN INFORMATION SUCH AS HEADER OR MOTION VECTOR |
| Bs | NUMBER OF BITS IN FIFO BUFFER SECTION |
| B | NUMBER OF OCCUPIED BITS IN PRESENT FIFO BUFFER SECTION |

FIG. 17

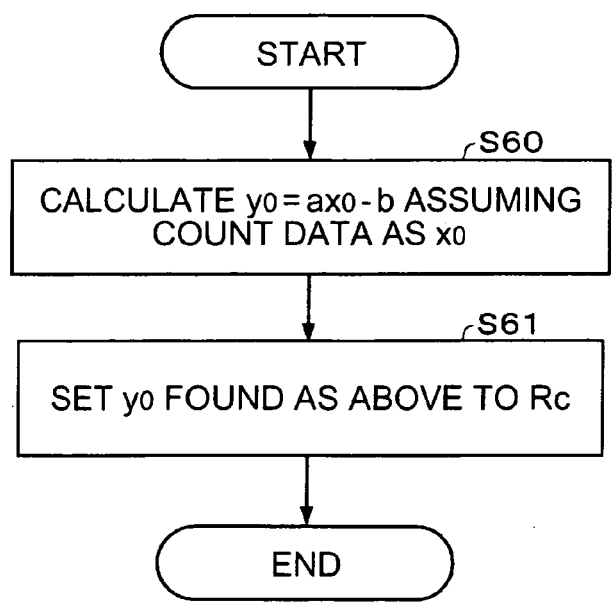

FIG. 18

IMAGE DATA COMPRESSION DEVICE, ENCODER, ELECTRONIC APPARATUS, AND METHOD OF COMPRESSING IMAGE DATA

RELATED APPLICATIONS

This application claims priority to Japanese Patent Application No. 2004-139755 filed May 10, 2004 which is hereby expressly incorporated by reference herein in its entirety.

BACKGROUND

1. Technical Field

The present invention relates to an image data compression device, an encoder, an electronic apparatus, and a method of compressing image data.

2. Related Art

As a general purpose encoding method for multimedia information such as image data of static images or moving images or voice data, MPEG-4 (Moving Picture Experts Group Phase 4) has been standardized. Portable instrument of recent years is capable of realizing encoding and decoding of image data compliant with the MPEG-4 standard to reproduce moving images or to communicate the moving images through a network.

According to the MPEG-4 standard, compressed data obtained by encoding image data of a moving image need to be generated at a constant rate. However, when compressing image data of moving images, the compression efficiency is varied greatly depending on the content of the image data. In MPEG-4 Visual Part (Recommendation ISO/IEC 14496-2: 1999(E) L), there is described a rate control method for generating the compressed data at a constant rate by controlling the code value to be generated so that the variation is fallen within a predetermined range.

It can be considered that, in performing the encoding (compressing) processes of the MPEG-4, the series of processes are executed by hardware. However, in this case, a large circuit scale is required, and if the circuit is made as an IC (semiconductor device, integrated circuit), it becomes difficult to miniaturize the IC. In particular, in portable instruments such as mobile phones, it cannot meet the requirement for miniaturization of the instruments.

In contrast, it can be considered that the series of processes of encoding is executed with software. However, in this case, a load on the CPU (Central Processing Unit) for executing the software is problematically increased. Accordingly, time the CPU consumes for other processes is constrained, thus degrading the performance of the instrument equipped with the CPU. Further, it causes the processing time to be increased, thus increasing power consumption. In particular, in portable instruments such as mobile phones, it cannot meet the requirement for low power consumption for restricting consumption of the battery.

In view of the above, it can be considered that the series of processes of encoding is shared by both hardware and software. However, as a result of study by the present inventors, it has been revealed that, when considering the most effective way of sharing the series of encoding processes by hardware and software, the rate control method disclosed in the MPEG-4 Visual Part (Recommendation ISO/IEC 14496-2: 1999(E) L) cannot be put into practice. That is, when sharing it by the hardware process and the software process each having a different processing speed, a buffer for absorbing the difference of the speeds is required. However, it has been revealed that, if the buffer is provided, the rate control method cannot be executed, thus the optimization of assignment of image data compression process to hardware and software and generation of compressed data at a constant rate are problematically incompatible.

Further, even if the generation rate of the compressed data can be controlled, the rate control method described in the MPEG-4 Visual Part (Recommendation ISO/IEC 14496-2: 1999(E) L) often causes block noises displayed in the image obtained by expanding the compressed data, thus the display quality can problematically be degraded.

Meanwhile, the amount of the compressed data is increased in order to prevent degradation of the display quality, thus it is problematical that a predetermined bit rate may not be maintained. For example, when the encoding process is executed for maintaining a predetermined bit rate, the maximum encoding size which can be generated as a result of encoding is determined in accordance with the encoding time. In this case, if a large number of bits are used in the first half of the encoding process, the possibility of causing the bit rate overrun is increased, and it becomes difficult to maintain the predetermined bit rate.

The present invention is proposed in view of the above technical problems, and aims to provide an image data compression device, an encoder, an electronic instrument, and a method of compressing image data, capable of optimizing assignment of the image data compression process to hardware and software, and of surely generating compression data at a constant rate while preventing degradation of the display quality.

SUMMARY

In order to solve the above problem, the present invention relates to an image data compression device, comprising: a quantizing section for quantizing image data with a quantization step changing in accordance with a quantization parameter; a FIFO buffer section for buffering the quantized data corresponding to a plurality of frames and quantized by the quantizing section; and an encoded data generating section for generating encoded data obtained by encoding the quantized data after reading the quantized data out of the FIFO buffer section asynchronously with writing to the FIFO buffer section; and a rate control section for controlling the data size of the encoded data by changing the quantization step of the quantizing section for each frame, wherein the rate control section finds a predicted data size of the encoded data for the precedent frame from the data size of the quantized data for the precedent frame to the present frame, one of setting and releasing an upper limit threshold of a quantization parameter based on the number of assignable bits assignable to a compressing process in order for maintaining a predetermined bit rate, or the number of remaining frames, or both the number of the assignable bits and the number of the remaining frames, finds the quantization parameter so as to be equal to or less than the upper limit threshold of the quantization parameter using the predicted data size when setting the upper limit threshold of the quantization parameter, and finds the quantization parameter irrespective of the upper limit threshold of the quantization parameter using the predicted data size when releasing the upper limit threshold of the quantization parameter.

In the present invention, the FIFO buffer section is provided between the quantizing section and the encoded data generating section. By thus configuring, the processes of the quantizing section and the encoded data generating section can be executed asynchronously and in parallel. And, if the rate of generation of the encoded data by the encoded data generating section is controlled, the rate control section finds the predicted data size of the encoded data generated by the encoded data generating section from the data size of the quantized data written to the FIFO buffer section, and then change the quantization step of the quantizing section based on the predicted data size.

Thus, as a result of configuring the processes of the quantizing section and the encoded data generating section to be executed asynchronously, even if the rate control method disclosed in the MPEG-4 Visual Part (Recommendation ISO/IEC 14496-2: 1999(E) L) cannot be implemented, the encoded data generation rate can be controlled, thus generating the encoded data, which is the compressed image data, can be generated at a constant rate.

Further, since the rate control section is arranged to find the quantization parameter so as to be equal to or less than the upper limit threshold of the quantization parameter, the size of the quantized data can be reduced to the extent that the image quality is not degraded, thereby reducing the size of the encoded data.

And, since the upper limit threshold of the quantization parameter is arranged to be set or released based on the number of assignable bits assignable to the compressing process in order for maintaining a predetermined bit rate, or the number of remaining frames, or both the number of the assignable bits and the number of the remaining frames, the degradation of the image quality can be prevented when the upper limit threshold of the quantization parameter is set, while the data size can drastically be reduced when the upper limit threshold of the quantization parameter is released, thus the bit rate can be maintained while the degradation of the image quality can also be prevented.

Further, the image data compression device according to the present invention, further comprises a frame skipping section for executing a skipping process of skipping the generating process of the image data to be supplied to the quantizing section, wherein the frame skipping section can execute the skipping process if the upper limit threshold of the quantization parameter is released.

Further, in the image data compression device according to the present invention, the frame skipping section can execute the skipping process two or more times with at least one frame of interval.

In the present invention, the frame skipping section is provided to execute the skipping process when the upper limit threshold of the quantization parameter is released. Therefore, even in the case the size of the encoded data may be increased by executing the rate control described above depending on images (especially, artificial images), which makes it difficult to surely maintain the bit rate, the increased amount of the encoded data generated for each frame can be suppressed, thus the bit rate can be maintained.

Further, in the image data compression device according to the present invention, the rate control section compares each reference bit number of various kinds of reference bit numbers defined within the range of the maximum encoding size for maintaining the bit rate with the number of the remaining assignable bits, compares each reference frame number of various kinds of reference frame numbers defined within the range of encoded frame number for maintaining the bit rate with the number of the remaining frames, and can set or release the upper limit threshold of the quantization parameter based on the result of comparison of each of the reference bit numbers with the number of the assignable bits and the result of comparison of each of the reference frame numbers with the number of the remaining frames.

According to the present invention, the upper limit threshold of the quantization parameter can delicately be set or released, thus realizing maintenance of the bit rate and prevention of image quality degradation.

Further, in the image data compression device according to the present invention, the rate control section, when setting the upper limit threshold of the quantization parameter, finds the quantization parameter so as to be equal to or less than the upper limit threshold of the quantization parameter and equal to or greater than a settable lower limit threshold of the quantization parameter using the predicted data size.

In the present invention, the rate control section is arranged to find the quantization parameter so as to be equal to or less than the upper limit threshold of the quantization parameter. In general, the larger the value of the quantization parameter is, the more data are removed from the image data to reduce the size of the quantized data, thus reducing the size of the encoded data. At the same time, the block noises become noticeable in the image obtained by decoding the encoded data. Therefore, according to the present invention, even if the rate control is executed as described above, it can be prevented that the block noises become noticeable in the image obtained by decoding the encoded compressed data.

Further, the rate control section is arranged to find the quantization parameter so as to be equal to or greater than the lower limit threshold of the quantization parameter. In general, the smaller the value of the quantization parameter is, the less data are removed from the image data to increase the size of the quantized data. At the same time, the block noises decrease in the image obtained by decoding the encoded data. Therefore, according to the present invention, even if the rate control is executed as described above, the data size can be prevented from becoming wastefully large.

Therefore, according to the present invention, the rate control capable of optimizing the compression efficiency as well as the image quality can easily be realized.

Further, in the image data compression device according to the present invention, if the settable lower limit threshold of the quantization parameter is set, the rate control section finds the quantization parameter using the predicted data size so as to be equal to or less than the upper limit threshold of the quantization parameter and equal to or greater than the lower limit threshold of the quantization parameter, when releasing the upper limit threshold of the quantization parameter, further releases the lower limit threshold of the quantization parameter, and finds the quantization parameter using the predicted data size irrespective of the upper limit threshold of the quantization parameter or the lower limit threshold of the quantization parameter.

According to the present invention, the quantization parameter is arranged to be found so as to be equal to or greater than the lower limit threshold of the quantization parameter if the lower limit threshold of the quantization parameter is set. In general, the smaller the value of the quantization parameter is, the less data are removed from the image data to increase the size of the quantized data. At the same time, the block noises decrease in the image obtained by decoding the encoded data. Therefore, according to the present invention, even if the rate control is executed as described above, the data size can be prevented from becoming wastefully large. In this case, according to the present invention, the rate control capable of optimizing the compression efficiency as well as the image quality can easily be realized.

Further, when the upper limit threshold of the quantization parameter is released, the lower limit threshold of the quantization parameter is arranged to be also released to resume the original rate control, thus enabling to control the bit rate in a similar condition to the logical formula described in the above recommendation.

Further, the image data compression device according to the present invention further comprises a count register for holding a count data corresponding to the number of times of access to the FIFO buffer section, wherein the rate control section finds the predicted data size from the count data, and changes the quantization step based on the predicted data size.

According to the present invention, since the equivalent information to the data size of the quantized data can be obtained, the image data compression device capable of realizing the rate control method defined in the MPEG-4 Visual Part (Recommendation ISO/IEC 14496-2: 1999(E) L) with a more simplified configuration can be provided.

Further, in the image data compression device according to the present invention, the predicted data size can be a data size found by linear-transforming the data size of the quantized data for the precedent frame.

Further, in the image data compression device according to the present invention, the linear transformation can be a transformation using a coefficient corresponding to encoding efficiency of the encoded data generating section.

Further, in the image data compression device according to the present invention, the linear transformation can be a transformation in which a correction corresponding to the size of the header added to the encoded data is further executed.

In the present invention, focusing attention on that the data sizes of the quantized data and the encoded data are in a linear relationship, it is arranged to be able to find the predicted data size by the linear transformation representing the linear relationship. Thus, the accurate rate control can be realized without increasing the load of processes.

Further, the image data compression device according to the present invention further comprises a quantization table for storing the value of the quantization step, and the rate control section changes the quantization step by executing the quantization using the product of the quantization parameter and the value of the quantization step.

Further, the image data compression device according to the present invention further comprises a discrete cosine transforming section for supplying the quantizing section with the discrete-cosine-transformed image data by a frame.

Further, the image data compression device according to the present invention further comprises a hardware processing section for processing the image data of moving images by hardware, and a software processing section for generating the encoded data by encoding by software the quantized data read out of the FIFO buffer section, wherein the hardware processing section includes the quantizing section and the FIFO buffer section, and the software processing section can include the encoded data generating section and the rate control section.

In this case, in the quantized data of moving images include overwhelmingly majority of zero data, and accordingly, in many cases, the number of kinds of the amount of information is overwhelmingly small in comparison with the data before quantization. Moreover, in general, the loads by the encoding operations themselves are also light. Therefore, if the process with small amount of information and a light operational load is processed by the software processing section, the load of the process is still light. On the contrary, most of the processes of the quantization have a large amount of information and require complicated operations, and accordingly, have too heavy load for software to process. And, although these processes have heavy loads, they have little necessity of modifications if they are standardized, and further, since they include repetitive processes, which is suited to be processed by hardware. Further, since the amount of data after processed by the hardware processing section is small, the amount of data transmitted from the hardware processing section to the software processing section is small accordingly, the transmission load is also light. Further, since the FIFO buffer section is provided between the software processing section and the hardware processing section, the software process and the hardware process can be executed in parallel. Still further, by using both of the software process and the hardware process with appropriate assignment, both of down sizing of the device and low power consumption can be realized.

Also, the software processing section can be configured to further include the frame skipping section.

Further, in the image data compression device according to the present invention, the hardware processing section outputs the difference between the input image data for the present frame and a precedent image data for the precedent frame to the present frame as motion vector information, outputs the image data obtained by executing the discrete cosine transformation on the motion vector information to the quantizing section, and generating the precedent image data based on inverse-quantized data obtained by inverse-quantizing the quantized data with the quantization step.

Further, in the image data compression device according to the present invention, the software processing section can encode the quantized data read out from the FIFO buffer section to variable length codes.

Further, in the image data compression device according to the present invention, the software processing section can execute a scanning process for reordering the quantized data read out from the FIFO buffer section, and encode the result of the scanning process to the variable length codes.

Further, in the image data compression device according to the present invention, the software processing section can execute a scanning process for finding a DC component and an AC component from the quantized data read out from the FIFO buffer section and then reordering the DC component and the AC component, and then encode the result of the scanning process to the variable length codes.

Further, the present invention relates to an encoder for executing image data compression process, comprising: an image input interface for executing an interfacing process for inputting image data; a quantizing section for quantizing the image data with a quantization step changing in accordance with a quantization parameter; a FIFO buffer section for buffering the quantized data corresponding to a plurality of frames and quantized by the quantizing section; and a host interface for executing an interfacing process with a host which reads out the quantized data stored in the FIFO buffer section asynchronously with writing to the FIFO buffer section, wherein the host finds a predicted data size of the encoded data for the precedent frame from the data size of the quantized data for the precedent frame to the present frame, one of setting and releasing an upper limit threshold of a quantization parameter based on the number of assignable bits assignable to a compressing process in order for maintaining a predetermined bit rate, or the number of remaining frames, or both the number of the assignable bits and the number of the remaining frames, finds the quantization parameter so as to be equal to or less than the upper limit threshold of the quantization parameter using the predicted data size when setting the upper limit threshold of the quantization parameter, and finds the quantization parameter irrespective of the upper limit threshold of the quantization parameter using the predicted data size when releasing the upper limit threshold of the quantization parameter, and the quantizing section changes the quantization step based on the quantization parameter found by the host.

Further, the encoder according to the present invention further comprises a skipping flag register for skipping the generating process of the image data, wherein the host finds the quantization parameter so as to be equal to or less than the upper limit threshold of the quantization parameter using the predicted data size when setting the upper limit threshold of the quantization parameter, finds the quantization parameter irrespective of the upper limit threshold of the quantization parameter using the predicted data size and sets the skipping flag register when releasing the upper limit threshold of the quantization parameter, and if the skipping flag register is set, the image data generating process for the present frame can be skipped.

Further, in the encoder according to the present invention, the host can set the skipping flag register two or more times with at least one frame of interval when releasing the upper limit threshold of the quantization parameter.

Further, in the encoder according to the present invention, if the settable lower limit threshold of the quantization parameter is set, the host finds the quantization parameter using the predicted data size so as to be equal to or less than the upper limit threshold of the quantization parameter and equal to or greater than the lower limit threshold of the quantization parameter, when releasing the upper limit threshold of the quantization parameter, further releases the lower limit threshold of the quantization parameter, and finds the quantization parameter using the predicted data size irrespective of the upper limit threshold of the quantization parameter or the lower limit threshold of the quantization parameter.

According to the present invention, the encoding process for compressing the image data of moving images form, for example, image pick-up section can be assigned to both the encoder and the host. Accordingly, the quantization and generation of the encoded data in the encoding process described above can be executed in parallel. Further, by using both of the encoder and the host with appropriate assignment, both of down sizing of the device mounting the encoder and low power consumption can be realized.

Further, the present invention relates to an electronic instrument including any one of the image data compression devices described above.

Further, the present invention relates to an electronic instrument including any one of the encoders described above.

According to the present invention, an electronic instrument capable of optimizing assignment of the image data compression process to hardware and software, and of surely generating compressed data at a constant rate while preventing degradation of the display quality Further the present invention relates to a method of compressing image data, comprising: finding a predicted data size of encoded data for the precedent frame to the present frame from a data size of quantized data for the precedent frame, the quantized data being obtained by quantizing image data with respect to each frame; one of setting and releasing an upper limit threshold of a quantization parameter based on the number of assignable bits assignable to a compressing process in order for maintaining a predetermined bit rate, or the number of remaining frames, or both the number of the assignable bits and the number of the remaining frames; finding a quantization parameter using the predicted data size, the quantization parameter being found so as to be equal to or less than the upper limit threshold of the quantization parameter when setting the upper limit threshold of the quantization parameter, and the quantization parameter being found irrespective of the upper limit threshold of the quantization parameter when releasing the upper limit threshold of the quantization parameter; changing the data size of encoded data obtained by encoding image data by quantizing the image data of the present frame with a quantization step changing in accordance with the quantization parameter; and skipping the generation process of the image data when frames each having the quantization parameter, which is found for every frame and is greater than a skipping threshold, continue more than a number of times set as a skipping threshold of consecutive number of times.

BRIEF DESCRIPTION OF THE DRAWINGS

FIGS. 1A and 1B are views for explaining the encoding process and the decoding process of the MPEG-4.

FIG. 5 is a diagram for explaining an example of quantized DCT coefficients.

FIG. 6 is a chart for explaining a model equation used in a rate control method.

FIG. 17 is a diagram for explaining variables used in the quantization parameter calculation process.

FIG. 18 is a flowchart of an example of a calculating process of the number of bits used for encoding.

DETAILED DESCRIPTION

Hereinafter, an embodiment of the present invention is described in detail with reference to the accompanying drawings. Note that the embodiment described below does not unreasonably limit the content of the present invention as claimed in the claim section. Further, not all of the components of the configuration described below are essential elements of the present invention.

1. MPEG-4

Firstly, an encoding process of the MPEG-4 will be briefly described. Further, a decoding process for expanding the compressed data encoded with the encoding process will also be described.

FIGS. 1A and 1B show views for explaining the encoding process and the decoding process of the MPEG-4. Since details of the processes are explained in, for example, "JPEG & MPEG, image compression technology easily comprehensible with illustrations" (co-authored by Hiroshi Ochi and Hideo Kuroda) published by Nippon Jitsugyo Publishing Co. Ltd., only the process relating to the present invention will mainly be described here.

In the encoding process shown in FIG. 1A, motion estimation (ME) with respect to two (two frames of) continuing images is firstly executed (step S1). Specifically, differences between corresponding pixels of the two images are found. Since the differences in an image region without any changes between the two images are zero, the amount of information can be reduced. In addition to the zero data in the image region, the differences (positive or negative components) in the other image region with changes between the two images forms the information reflecting the motion estimation.

Figure 2:
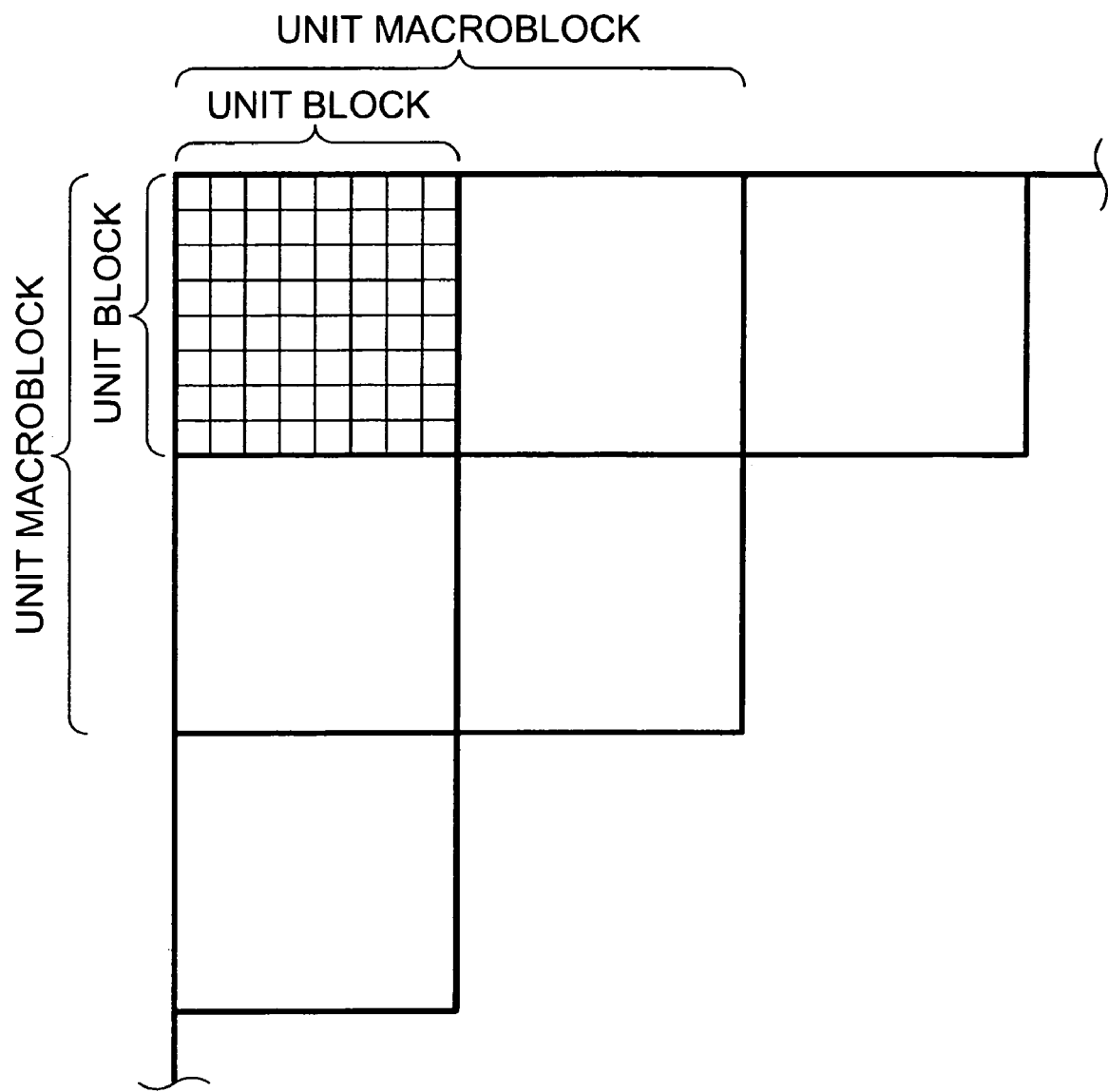
FIG. 2 is a diagram for explaining a macro block.
Figures 3, 4:
FIG. 3 is a diagram for explaining an example of DCT coefficients.
FIG. 4 is a diagram for explaining an example of a quantization table.

Subsequently, discrete cosine transform (DCT) is executed (step S2). The discrete cosine transform (DCT) is operated by one block formed of 8 pixels×8 pixels shown in FIG. 2 to find the DCT coefficient by one block. The DCT coefficient transformed with the discrete cosine transform represents changes in the thickness of the image in the one block with the overall brightness (DC component) and the spatial frequency (AC component). FIG. 3 shows an example of the DCT coefficient (quoted from the publication mentioned above, FIG. 5-6 in page 116) in the one block formed of 8 pixels by 8 pixels. The DCT coefficient on upper left corner thereof represents the DC component, and others represent the AC components. Note that, if the high frequency components in the AC components are omitted, there are only little effects to image recognition.

Subsequently, the quantization of the DCT coefficients is executed (step S3). This quantization is executed in order to reduce an amount of information by dividing each of the DCT coefficients in the one block with quantization step value at corresponding position in the quantization table. As an example, the DCT coefficients in the one block are shown in FIG. 5 (quoted from the publication mentioned above, FIGS. 5-9 and 5-10 in page 117), which is obtained by quantizing the DCT coefficients shown in FIG. 3 using the quantization table shown in FIG. 4. As shown in FIG. 5, if the DCT coefficients in the high frequency component in particular are divided by the quantization step values and then rounded-off after the decimal points, almost all become zero data, thus drastically reducing the amount of information.

A feedback route is necessary for the encoding process in order to execute the motion estimation (ME) described above between the present frame and the succeeding frame. In the feedback route, as shown in FIG. 1A, the inverse quantization (iQ), the inverse DCT, and the motion compensation (MC) are executed (steps S4 through S6). Note that, although descriptions regarding a detailed operation of the motion compensation are omitted, the process is executed by one macroblock composed of 16 pixels by 16 pixels shown in FIG. 2.

In the present embodiment, the process of steps S1 through S6 described above is executed by hardware.

A DC/AC (direct current/alternate current components) prediction process executed in the step S7 and a scan process executed in the step S8 shown in FIG. 1A are both necessary for enhancing the encoding efficiency of variable length code (VLC) in the step S9. Because, in encoding to the variable length code of the step S9, the difference between adjacent blocks need to be encoded with respect to the DC component, and regarding the AC component, the order of the encoding needs to be determined by scanning (also referred to as a zigzag scan) inside the block from a lower frequency side to a higher frequency side.

The encoding to the variable length code in the step S9 is also referred to as entropy encoding, and as the encoding principle, the encoding is executed so as to express what has higher frequency of appearance in fewer codes. As the entropy encoding, Huffman coding is adopted.

And, using the results in the step S7 and the step S8, the difference between the adjacent blocks is encoded with respect to the DC component, and regarding the AC component, the DCT coefficient values are encoded in sequence from the lower frequency side to the higher frequency side according to the order of scanning.

Here, an amount of information generated in accordance with the image data varies depending on complexity of the image or hardness of the motion. In order to absorb the variation and to transfer at a constant transfer rate, the amount of generated codes needs to be controlled, thus requiring a rate control in the step S10. A buffer memory is typically provided for the rate control, and the amount of information stored therein is monitored to prevent the buffer memory from overflowing, thus controlling the amount of generated information. Specifically, the quantization quality in the step S3 is set to be rough to reduce the amount of bits for expressing the DCT coefficient value.

In the present embodiment, the process of steps S7 through S10 described above is executed by software. In other words, the process of steps S7 through S10 is realized by the hardware installing the software.

FIG. 1B shows a decoding process of the image data compressed with the encoding process shown in FIG. 1A. The decoding process is completed by inversely executing the encoding process shown in FIG. 1A in reverse. Note that "post filter" in FIG. 1B is a filter for canceling the block noises. Further, "TUV/RGB conversion" in FIG. 1B denotes a transformation of the output of the post filter from the YUV format to the RGB format.

2. Rate Control

Hereinafter, regarding the rate control executed in the step S10 shown in FIG. 1A, the method described in the MPEG-4 Visual Part (Recommendation ISO/IEC 14496-2: 1999(E) L) will briefly be explained. In this method, the quantization parameter during the encoding process is varied. By varying the quantization parameter, the quantization step in the quantization process (the step S3) shown in FIG. 1A is varied to vary the quantization quality, thus controlling the amount of generated codes (data size).

In this method, the quantization parameter Qc is set for each frame to control the amount R of codes generated in accordance with encoding of one frame. In this case, the quantization parameter Qc is found along the model equation shown in FIG. 6.

In FIG. 6, R denotes the amount of codes generated in accordance with encoding of the one frame, Qc denotes the quantization parameter, Ec denotes the complexity of the frame, and $X_1$, $X_2$ denotes parameters of the present model. As the complexity Ec of the frame, the absolute average of the pixels subject for encoding is used. In this case, with respect to the intercoded macroblock, the complexity Ec of the frame can be found, after the motion estimation, as a value obtained by dividing with the area A the summation of the absolute difference values $X'_{ij}$ between the present frame and the precedent frame. Regarding the intercoded macroblock, it can be found as a value obtained by dividing with the area A the summation of the absolute difference values ($|Xij-\mu|$) between the present frame and a reference value $\mu$. Note that the reference value $\mu$ can be an average value of all the pixels inside the macroblock.

As described above, in FIG. 6, the amount of generated codes can be modeled with the complexity of the frame and a quadratic of the reciprocal number of the quantization parameter.

Figure 7:
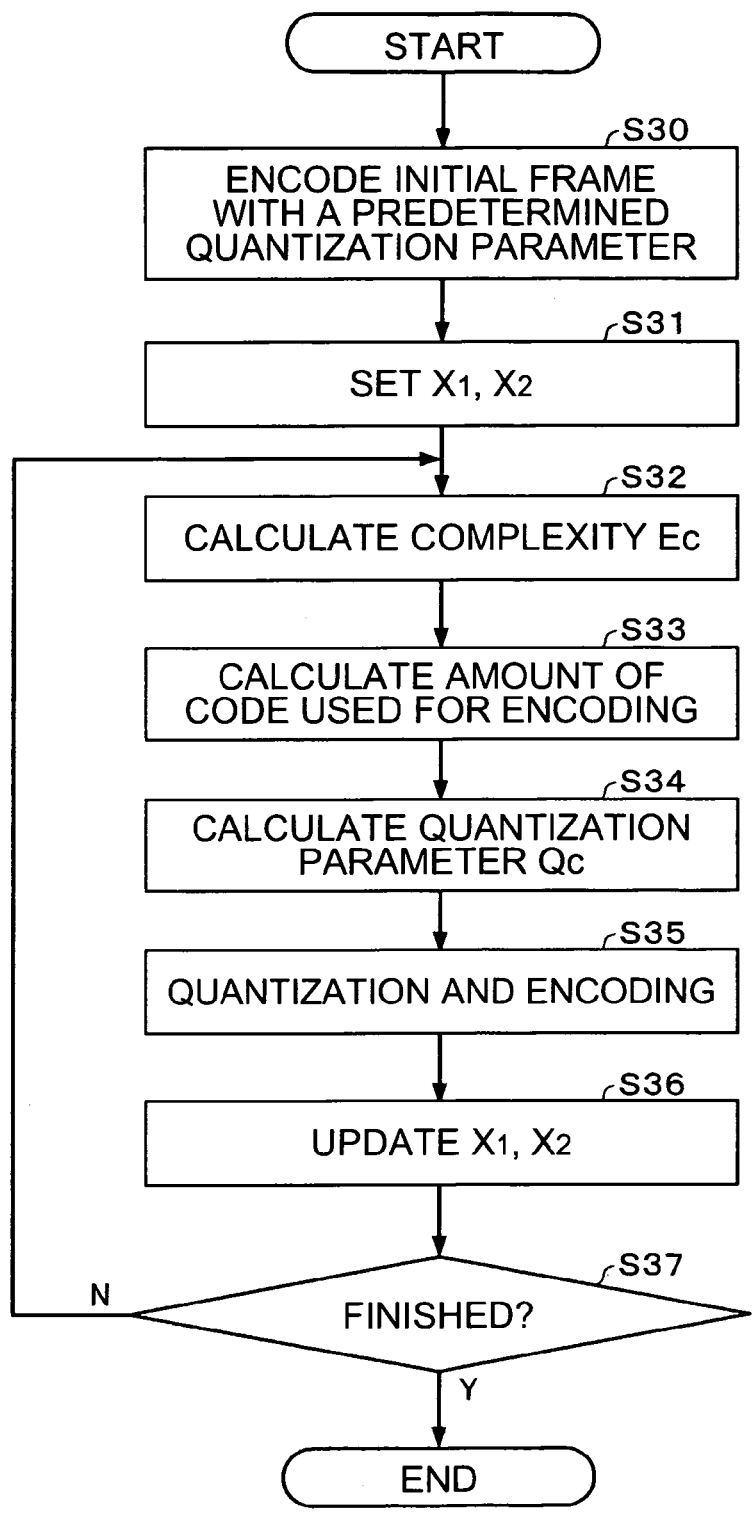
FIG. 7 is a flowchart of an example of the rate control process using the model equation shown in FIG. 6.

FIG. 7 shows an example of a process flow of the rate control using the model equation shown in FIG. 6.

Firstly, an initial frame is encoded using a predetermined quantization parameter (step S30). And then, initial values of the model parameters $X_1$, $X_2$ are set (step S31). Subsequently, the complexity Ec of the present frame is calculated (step S32). The complexity Ec can be found by using the equation shown in FIG. 6. And then, the amount of codes used for encoding is found based on the amount of usable remaining codes and the amount of codes used for the precedent frame (step S33).

Further, the model parameter $X_1$, $X_2$ defined in the step S31 and the complexity Ec found in the step S32 are set in the model equation shown in FIG. 6. Also, a value obtained by subtracting the amount of bits other than information such as a header or a motion vector in the amount of bits used for the precedent frame from the amount of codes to be used for encoding found in the step S33 is set to the model equation shown in FIG. 6 as the amount R of codes generated in accordance with encoding of one frame. And then, the quadratic equation with a parameter of Qc is resolved to find the quantization parameter Qc (step S34).

Subsequently, the quantization and the encoding of the frame are executed using the quantization parameter Qc found in the step S34 (step S35), and then, based on the quantization parameter and the amount of generated codes of the frame encoded one frame before the present frame, the model parameters X1, X2 are found to be updated from the model equations shown in FIG. 6 (step S36).

If the processing flow is terminated with a predetermined condition (step S37: Y), the series of processes are terminated (end), if not terminated (step S37: N), it goes back to the step S32. The process as described above is executed for every frame.

As described above, in the rate control method described in the MPEG-4 Visual Part (Recommendation ISO/IEC 14496-2: 1999(E) L), the encoding result of the precedent frame needs to be reflected to the encoding process for the succeeding frame.

3. Image Data Compression Device

Meanwhile, the present embodiment provides the image data compression device capable of assigning the series of encoding processes described above to both the hardware and the software and of optimizing the assignment thereof.

Figure 8:
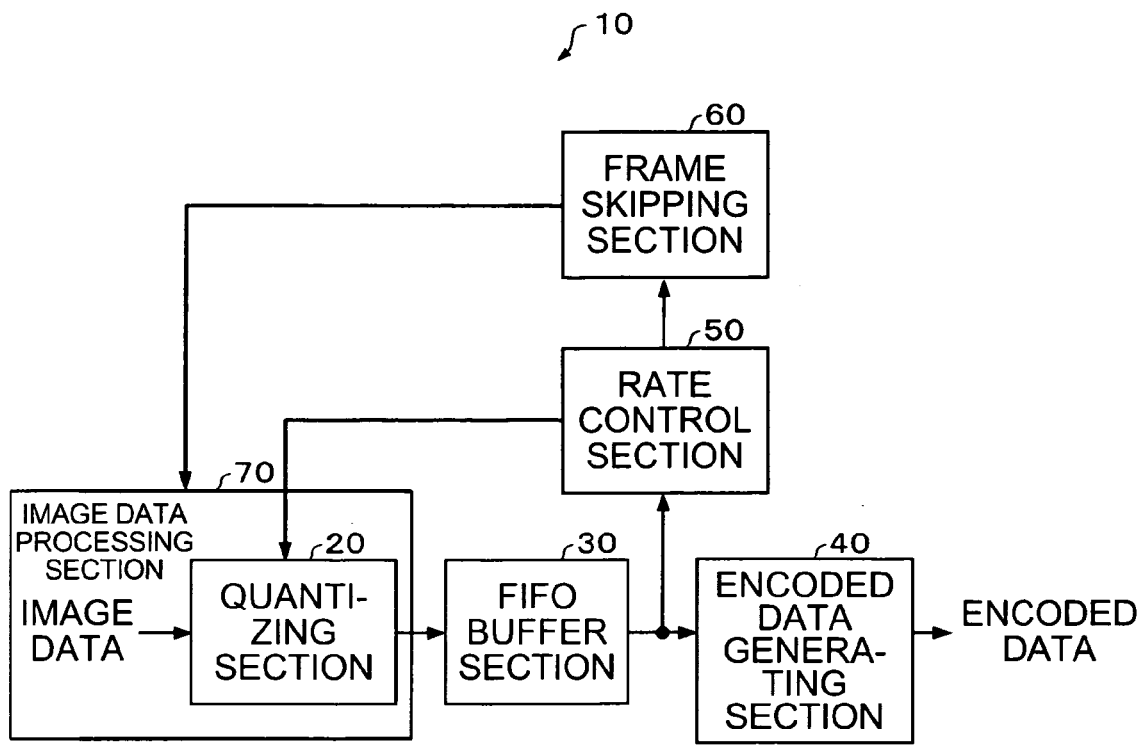
FIG. 8 is a block diagram of a schematic configuration of an image data compression device according to the present embodiment.

FIG. 8 shows a schematic block diagram of the configuration of the image data compression device according to the present embodiment.

The image data compression device 10 of the present embodiment includes an image data processing section 70 having a quantizing section 20. The image data processing section 70 executes a process for compressing image data input by a frame. The quantizing section 20 executes the process of the step S3 shown in FIG. 1A. The quantizing section 20 quantizes the image data by a frame with the quantization step varied in accordance with the quantization parameter. In the quantizing section 20, the quantization parameter set by a frame is set. In this case, the image data can be expressed with, for example, DCT coefficients processed in the step S2 shown in FIG. 1A. In this case, the DCT coefficients shown in FIG. 3 are divided by respective products of the quantization parameter and the quantization step values in the quantization table shown in FIG. 4, and quantized as shown in FIG. 5.

The image data compression device 10 includes a FIFO buffer section 30. The quantized data quantized by the quantizing section 20 and corresponding to a plurality of frames are buffered by the FIFO buffer section 30. The quantized data output from the quantizing section 20 by a frame are sequentially stored in the FIFO buffer section 30. And, the FIFO buffer section 30 functions as a first-in-first-out memory circuit.

The image data compression device 10 includes an encoded data generating section 40. The encoded data generating section 40 retrieves from the FIFO buffer section 30 the quantized data corresponding to one frame, and generates the encoded data which is obtained by encoding the quantized data. The encoded data generating section 40 retrieves the quantized data corresponding to one frame from the FIFO buffer section 30 asynchronously with writing to the FIFO buffer section 30.

As described above, by providing the FIFO buffer section 30 in between the quantizing section 20 (an image data processing section 70) and the encoded data generating section 40, the process of the quantizing section 20 which is a heavy load can be assigned to the hardware while the encoding process of the encoded data generating section 40 which is a light load can be realized by the software process, and further, it becomes possible to deal with the both processes in parallel.

Hereinafter, the description will be made assuming that the quantizing section 20 (image data processing section 70) is realized by, for example, fast hardware, while the encoded data generating section 40 is realized by, for example, a slow software process. However, they are not so limited, but the present embodiment can also be adopted to the case in which the encoded data generating section 40 retrieves the quantized data from the FIFO buffer section 30 asynchronously with writing to the FIFO buffer section 30. Accordingly, the quantizing section 20 (image data processing section 70) can be realized by, for example, fast hardware while the encoded data generating section 40 can be realized by, for example, slow hardware. Alternatively, the quantizing section 20 (image data processing section 70) and the encoded data generating section 40 are realized by hardware with software installed therein to execute processes asynchronously with each other.

The image data compression device 10 includes a rate control section 50. The rate control section 50 finds a data size of the encoded data of the precedent frame to the present frame as a predicted data size by a prediction based on a data size of the quantized data of the precedent frame, and varies the quantization step based on the predicted data size. As apparent from FIG. 5, the larger the quantization step is, the more the zero data in the quantized DCT coefficients are. On the contrary, the smaller the quantization step is, the less the zero data in the quantized DCT coefficients are. The quantized data, in which the number of the zero data can be increased and decreased, are written to the FIFO buffer section 30. As a result, the size of the encoded data, which is obtained by encoding by the encoded data generating section 40 the quantized data retrieved from the FIFO buffer section 30, can also be varied in accordance with the quantization parameter.

As described above, in the rate control method described in the MPEG-4 Visual Part (Recommendation ISO/IEC 14496-2: 1999(E) L), the encoding result of the precedent frame needs to be reflected to the encoding process for the succeeding frame. However, if it is arranged that the quantization by the quantizing section 20 and the encoding by the encoded data generating section 40 are respectively assigned to the hardware and the software, they are processed asynchronously with each other. Accordingly, the quantized data retrieved in the FIFO buffer section 30 may be the data of the frame more than two frames before of the frame whose data are under quantization by the quantization section 20. Therefore, the rate control method described in the MPEG-4 Visual Part (Recommendation ISO/IEC 14496-2: 1999(E) L), in which the encode results of the precedent frame is reflected to encoding of the succeeding frame, cannot be realized.

Consequently, in the present embodiment, the rate control section 50, as described above, finds the predicted data size of the encoded data of the precedent frame to the present frame to executes the rate control base on the predicted data size. In this case, in the present embodiment, the predicted data size is found focusing on the following characteristics.

Figure 9:
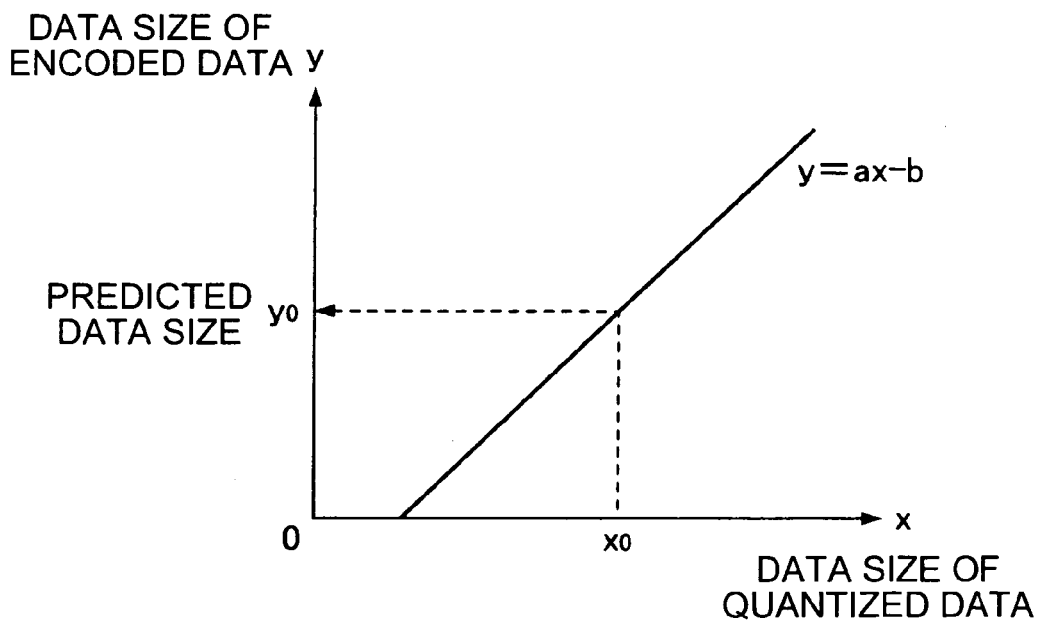
FIG. 9 is a chart for explaining a predicted data size.

FIG. 9 shows a chart for explaining a relationship between the data size of the quantized data and the data size of the encoded data. In this case, the quantized data are the data retrieved from the quantizing section 20, namely the data generated in the step S3 of FIG. 1A. Further, the encoded data are the data obtained by encoding the quantized data by the encoded data generating section 40, namely the data generated in the step S9 of FIG. 1A.

As shown in FIG. 9, there is a linear relationship between the data size of the quantized data and the data size of the encoded data. Namely, assuming that the data size of the quantized data is x, and the data size of the encoded data is y, y can approximately be found from the equation (1) using x as a parameter.

$$y = ax - b \text{ (where a, b are positive real numbers)} \quad (1)$$

Therefore, the predicted value $y_0$ of the data size of the encoded data can be found by executing linear transformation (homogeneous transformation) of the data size $x_0$ of the quantized data. In the equation (1), a denotes a coefficient in accordance with the encoding efficiency of the encoded data generating section 40. This coefficient is determined in accordance with the characteristics of the process by the encoded data generating section 40. Further specifically, this coefficient can be the compression coefficient of the Huffman coding process for the Huffman coding executed in the encoded data generating section 40.

Further, in the equation (1), b is a number corresponding to a data size of the header information of the encoded data generated by the encoded data generating section 40. If, for example, the encoded data are the stream data of the MPEG-4, the data size of the header information of the MPEG-4 is defined to be b. Therefore, the linear transformation of the equation (1) can be a transformation for further executing a compensation of the header size added to the encoded data.

Such values as a and b in the above equation (1) are found by statistically processing the relationship between the data size of the quantized data and the data size of the encoded data with respect to, for example, a plurality of kinds of image data.

By reflecting the predicted data size thus found to the encoding process of the succeeding frame as the encoding result of the precedent frame, the rate control method described in the MPEG-4 Visual Part (Recommendation ISO/IEC 14496-2: 1999(E) L) can be executed. Thus, with respect to the compression process of image data, the optimization of the process assignment to the hardware and the software as well as realization of more accurate rate control can be achieved.

Note that, although the predicted data size is found from the data size of the quantized data in FIG. 8, the present embodiment is not limited to this. The predicted data size can also be found from equivalent information to the data size of the quantized data.

Hereinafter, as the equivalent information to the data size of the quantized data, the number of times of access to the FIFO buffer section 30 (the number of times of writing or the number of times of reading) in each frame is used. By writing to the FIFO buffer section 30 by a predetermined number of bytes, the number of times of access in each frame can be used as the information equivalent to the data size of the quantized data in each frame. Further, by reading the FIFO buffer section 30 by a predetermined number of bytes, the number of times of access in each frame can be used as the information equivalent to the data size of the quantized data in each frame.

Figure 10:
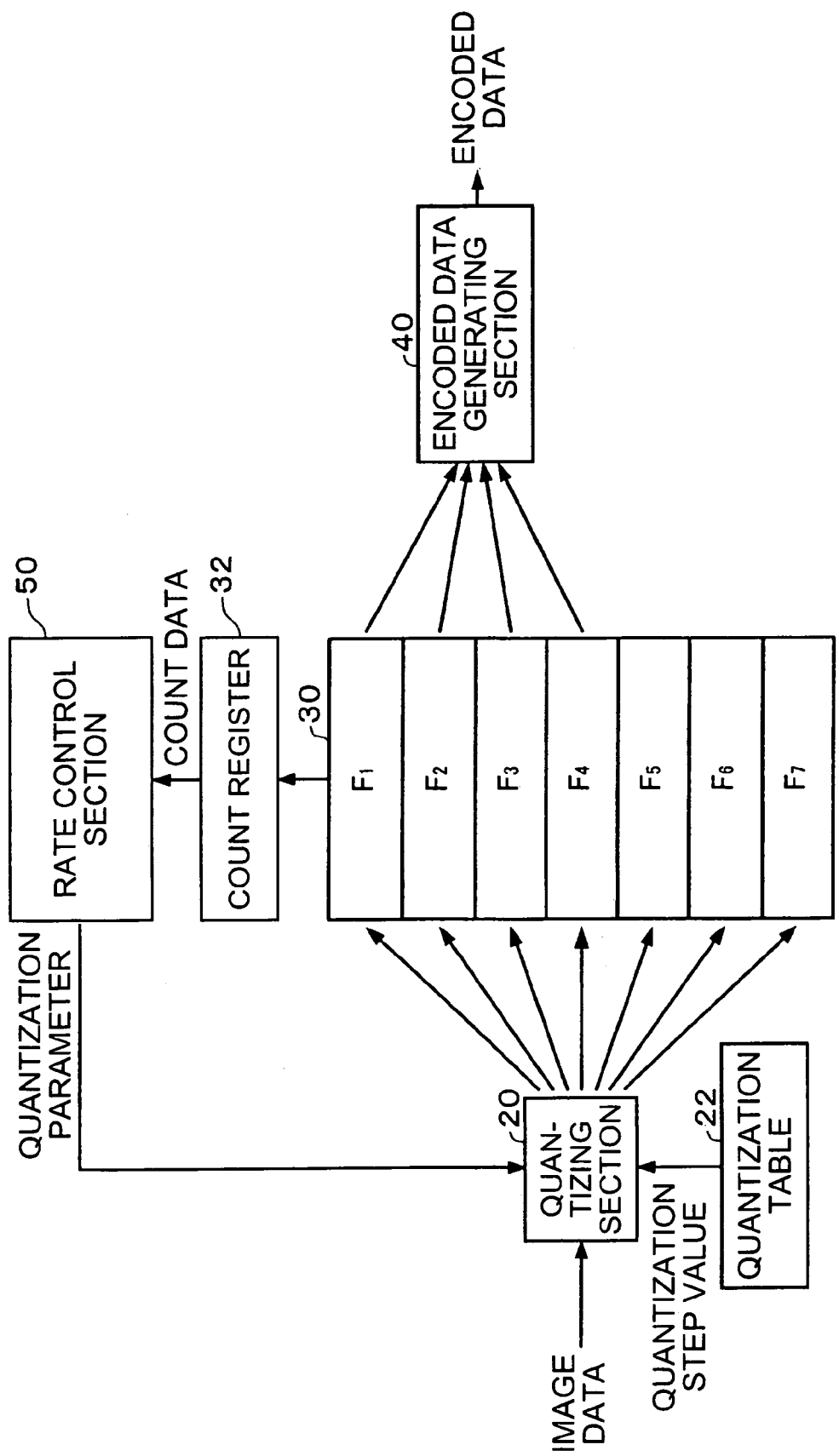
FIG. 10 is a diagram for explaining a rate control method according to the present embodiment.

FIG. 10 shows a diagram for explaining the method of the rate control according to the present embodiment. Note that the same parts as those of the image data compression device 10 shown in FIG. 8 are denoted with the same reference numerals and explanations therefore are omitted if appropriate. Note that, in FIG. 10, the FIFO buffer section 30 is assumed to be able to store the quantized data of as much as seven frames.

Figure 11:
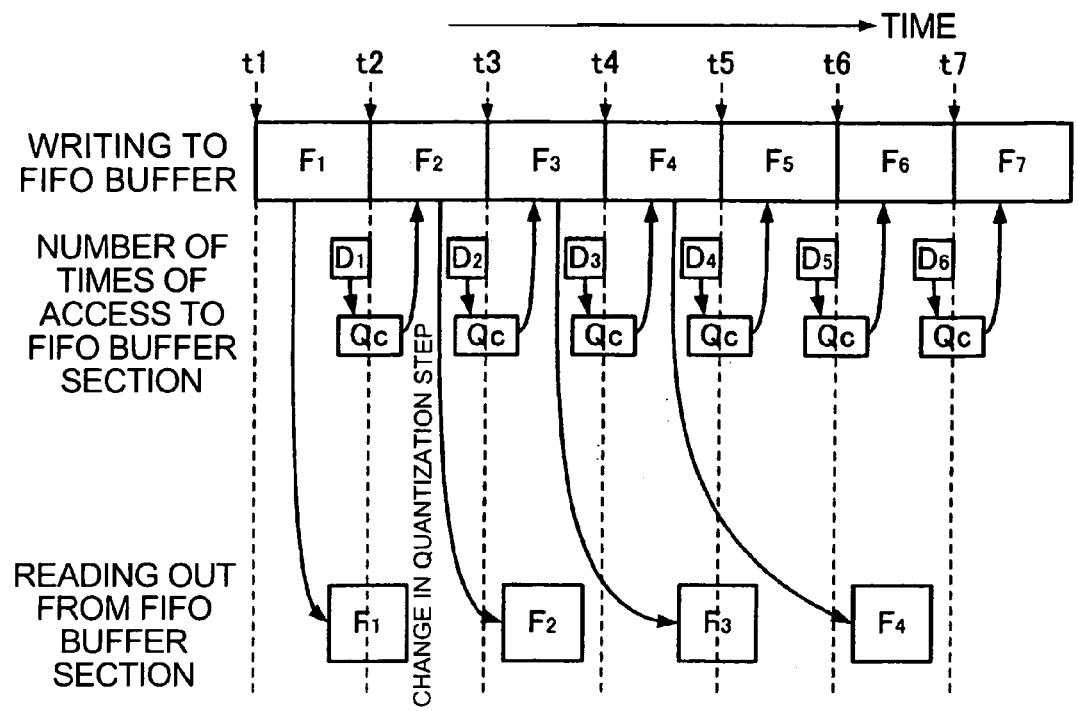
FIG. 11 is a schematic diagram of operational timing of the rate control method shown in FIG. 10.

FIG. 11 shows a schematic diagram of the operational timing of the rate control method shown in FIG. 10.

The quantizing section 20 quantizes image data by a frame as a unit. For example, the quantization table 22 shown in FIG. 4 with the quantization step values set thereto is provided. And, the quantizing section 20 quantizes the image data by a frame based on the quantization step values set to the quantization table 22 and the quantization parameter from the rate control section 50. More specifically, using the quantization parameter as a coefficient of the quantization step value, the quantizing section 20 executes quantization using the product of the quantization parameter and the quantization step value to vary the quantization step.

The quantizing section 20 quantizes the image data by a frame at time points of t1, t2, and so on, and then writes the quantized data to the FIFO buffer section 30 in the order of a first frame $F_1$, a second frame $F_2$, and so on. The count data stored by the count register 32 in each frame is initialized in every frame, and incremented to be updated every time writing to the FIFO buffer section 30 occurs. By thus arranged, the count data corresponding to the number of times of writing to the FIFO buffer section 30 is set to the count register 32 when the writing of the quantized data in each frame is finished.

Meanwhile, the encoded data generating section 40 retrieves the quantized data from the FIFO buffer section 30 by a frame asynchronously with the writing timing of the quantized data to the FIFO buffer section 30 to execute encoding process.

The rate control section 50, independently from the process of the encoded data generating section 40, varies the quantization step of the quantizing section 20 based on the count data at the time point when the writing of the quantization data of each frame is completed, and reflects it to the process for the succeeding frame. Thus, in the succeeding frame to the frame in which writing of the quantized data has been finished, the size of the quantized data quantized by the quantizing section 20 is varied, and as a result, the size of the encoded data generated by the encoded data generating section 40 is also varied.

In FIG. 11, the encoded data generating section 40 sequentially retrieves the quantized data of a first through a fourth frames $F_1$ through $F_4$ from the FIFO buffer section 30, and generates and then outputs the encoded data of each of the frames.

When writing of the quantized data of the first frame $F_1$ to the FIFO buffer section 30 is completed, the count data $D_1$ is stored in the count register 32. The count data $D_1$ is the data corresponding to the number of times the quantized data of the first frame $F_1$ is written to the FIFO buffer section 30. The count data $D_1$ is homologized to the data size of the quantized data of the first frame $F_1$. The count data is then initialized at the beginning of the second frame $F_2$, and the count data $D_2$ is stored when writing of the quantized data of the second frame $F_2$ to the FIFO buffer section 30 is completed. The count data $D_2$ is the data corresponding to the number of times the quantized data of the second frame $F_2$ is written to the FIFO buffer section 30.

The rate control section 50 read out the count data every time the writing to the FIFO buffer section 30 is completed, and varies the quantization step of the succeeding frame. In FIG. 11, when the writing of the quantized data of the first frame $F_1$ is completed, the rate control section 50 retrieves the count data $D_1$, and finds the predicted data size in accordance with the count data $D_1$. And then, as explained in relation to FIGS. 6 and 7, the rate control section 50 calculates an amount of codes used for encoding the second frame $F_2$ using the predicted data size to find the quantization parameter Qc.

As a result, the quantizing section 20 quantizes the image data of the second frame $F_2$ using the product of the quantization step values in the quantization table 22 and the quantization parameter Qc found in accordance with the predicted data size of the encoded data of the first frame $F_1$. The quantization results are written to the FIFO buffer section 30. As described above, by using the predicted data size of the precedent frame for each frame, the encoded data can be generated at a desired rate.

3.1 Upper Limit Threshold of Quantization Parameter and Lower Limit Threshold of Quantization Parameter Further, even if the rate control is executed as described above, it can be supposed that block noises become noticeable in the image obtained by decoding the encoded compressed data depending on the target images of encoding. This is because, even if the generation rate of the compressed data can be controlled using the rate control method described in the MPEG-4 Visual Part (Recommendation ISO/IEC 14496-2: 1999(E) L), the block noises are often displayed in the image obtained by decoding (expanding) the compressed data, thus the display quality can problematically be degraded.

Figure 12:
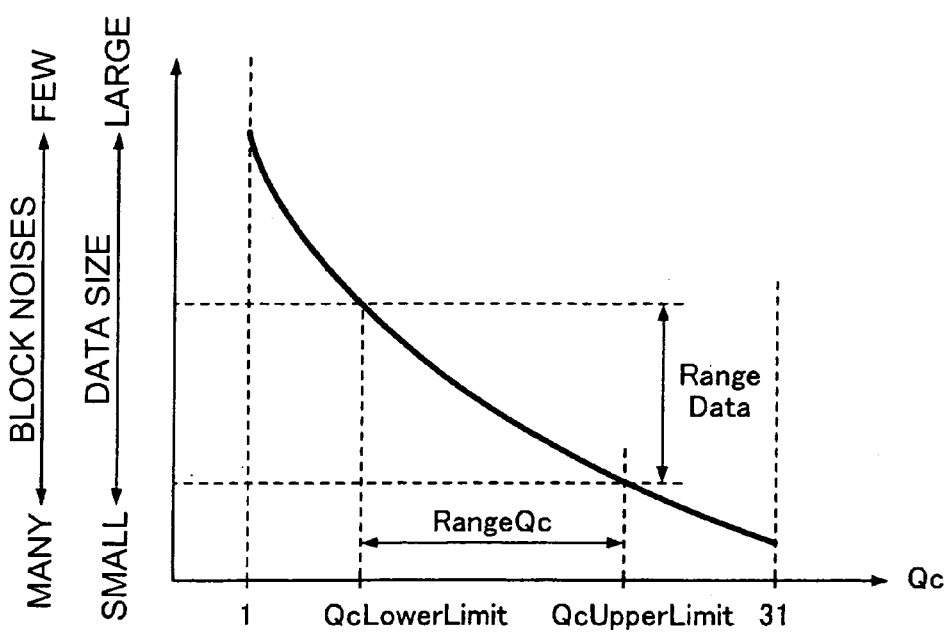
FIG. 12 is a schematic chart of a relationship between a quantization parameter, a data size of encoded data, and block noises.

FIG. 12 schematically shows a relationship between the quantization parameter, the data size of the encoded data, and the block noise. In FIG. 12, the horizontal axis represents the quantization parameter, and the vertical axis represents the data size and the block noise. Note that, in the rate control method described in the MPEG-4 Visual Part (Recommendation ISO/IEC 14496-2: 1999(E) L), the range of the value of the quantization parameter Qc is 1 through 31.

As shown in FIG. 12, the larger the value of the quantization parameter is, the more data are removed from the image data to set the DCT coefficients as zero data, thus reducing the size of the quantized data and reducing the size of the encoded data. At the same time, the block noises become noticeable in the image obtained by decoding the encoded data. Namely, the smaller the data size is, the more the block noises are.

Therefore, in the present embodiment, an upper limit threshold QcUpperLimit of the quantization parameter is provided to prevent the value of the quantization parameter Qc from increasing beyond a predetermined value. The value of the upper limit threshold QcUpperLimit of the quantization parameter is determined prior to the rate control. Therefore, the rate control section 50 finds the predicted data size of the encoded data in the precedent frame in accordance with the data size of the quantized data in the precedent frame to the present frame, and then finds the quantization parameter using the predicted data size so that the value thereof is not greater than the allowable upper limit threshold. As described above, by setting Qc as Qc≦QcUpperLimit, if the rate control is executed as described above, it can be prevented that the block noises become noticeable in the image obtained by decoding the encoded compressed data.

In contrast, the smaller the value of the quantization parameter is, the less image data are removed to decrease the zero data in the DCT coefficients. Accordingly, the size of the quantized data becomes larger, thus increasing the size of the encoded data. At the same time, the block noises decrease in the image obtained by decoding the encoded data. Namely, the larger the data size is, the less the block noises are. For example, if the value of the quantization parameter Qc equals to 1, the decoded image can be of the finest quality, but a huge amount of data are used as the encoded data for one frame. In this case, all of the noises derived from an image pickup section and unidentifiable for a naked eye remain.

Therefore, in the present embodiment, a lower limit threshold QcLowerLimit of the quantization parameter is provided to prevent the value of the quantization parameter Qc from becoming lower than a predetermined value. The value of the upper limit threshold QcLowerLimit of the quantization parameter is determined prior to the rate control. Therefore, the rate control section 50 finds the predicted data size of the encoded data in the precedent frame in accordance with the data size of the quantized data in the precedent frame to the present frame, and then finds the quantization parameter using the predicted data size so that the value thereof is not smaller than the allowable lower limit threshold. As described above, by setting Qc as Qc≧QcLowerLimit, even if the rate control is executed as described above, the data size can be prevented from becoming wastefully large.

As described above, the rate control section 50 can be arranged to determine the quantization parameter using the predicted data size so as to be equal to or greater than the upper limit threshold QcUpperLimit of the quantization parameter or equal to or greater than the lower limit threshold QcLowerLimit of the quantization parameter, but not so limited.

The rate control section 50 can also be arranged to find the quantization parameter, using the predicted data size as described above, so as to be equal to or less than the upper limit threshold QcUpperLimit of the quantization parameter and equal to or greater than the lower limit threshold QcLowerLimit of the quantization parameter. In this case, by setting the value of the quantization parameter Qc within the range RangeQc shown in FIG. 12, the data size can be set within the range RangeData, thus easily realizing the rate control capable of optimizing the compression efficiency as well as the image quality.

3.2 Setting and Releasing of the Upper Limit Threshold of the Quantization Parameter Incidentally, when the compression process is executed for every frame, the size of the encoded data can be increased depending on images (especially in artificial images) to make it impossible to surely maintain the bit rate. In particular, in case, as described above, the upper limit threshold QcUpperLimit of the quantization parameter for the quantization parameter Qc is provided, the degradation of the image can be prevented, but at the same time, the size of the encoded data in each frame cannot help increasing, thus increasing the possibility of interfering the constant bit rate.

Accordingly, in the present embodiment, the rate control section 50 is arranged to set or release the upper limit threshold QcUpperLimit of the quantization parameter under a certain condition.

More specifically, the rate control section 50 sets or releases the upper limit threshold of the quantization parameter based on a number of bits assignable to the compression process in order for maintaining a predetermined bit rate, the number of remaining frames, or both of the number of the assignable bits and the number of remaining frames.

When the upper limit threshold QcUpperLimit of the quantization parameter is set, the rate control section 50 finds the quantization parameter Qc so as to be equal to or less than the upper limit threshold QcUpperLimit of the quantization parameter. In contrast, when the upper limit threshold QcUpperLimit of the quantization parameter is released, the rate control section 50 finds the quantization parameter Qc independently from the upper limit threshold QcUpperLimit of the quantization parameter.

By thus arranged, the degradation of the image quality can be prevented when the upper limit threshold QcUpperLimit of the quantization parameter is set, while the data size can drastically be reduced when the upper limit threshold QcUpperLimit of the quantization parameter is released, thus the bit rate can be maintained while the degradation of the image quality can also be prevented.

Figure 13:
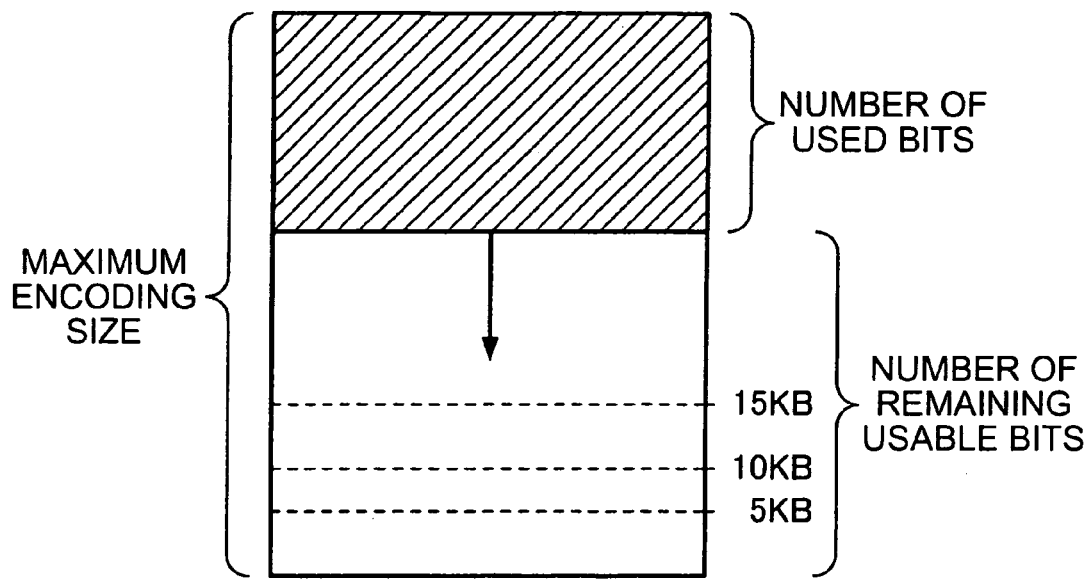
FIG. 13 is a chart for explaining the number of bits assignable to a compressing process.

FIG. 13 shows a diagram for explaining the number of bits assignable to the compression process.

The case is considered in which, for example, image data of moving images with a frame rate of 15 frame per second (fps) and encoding time of 10 seconds are generated with a bit rate of 64 k bit per second (bps). In this case, the maximum encoding size is 80 k bytes (=64 k/8×10). Therefore, the size of data which can be encoded while maintaining a predetermined bit rate is found as 80 k bytes.

And, every time the encoded data are generated by encoding by a frame, the number of the used bits increases within the maximum encoding size, and the number of the remaining usable bits (the number of bits assignable to the compression process) decreases.

At this point, the rate control section 50 compares each reference bit number of various kinds of reference bit numbers defined within the range of the maximum encoding size (for maintaining the bit rate) with the number of remaining usable bits. In FIG. 13, 120 k bits (15 k bytes), 80 k bits (10 k bytes), and 40 k bits (5 k bytes) are provided as the reference bit numbers. Although three kinds of the reference bit numbers are provided in FIG. 13, two kinds thereof or four or more kinds thereof can also be adopted.

And, the rate control section 50 sets or releases the upper limit threshold of the quantization parameter in accordance with the result of comparison of the number of the remaining usable bits and each of the reference bit numbers and the number of the remaining frames. More specifically, the number of the remaining usable bits which decreases as the encoding process proceeds is compared with 120 k bits, 80 k bits, and 40 k bits, and the upper limit threshold of the quantization parameter is set or released taking the number of the remaining frames at the time of each comparison into consideration. For example, when the number of the remaining usable bits reaches the reference bit number, the upper limit threshold of the quantization parameter is set if the number of remaining frames is judged to be small, but the upper limit threshold of the quantization parameter is released if the number of remaining frames is judged to be large.

Figure 14:
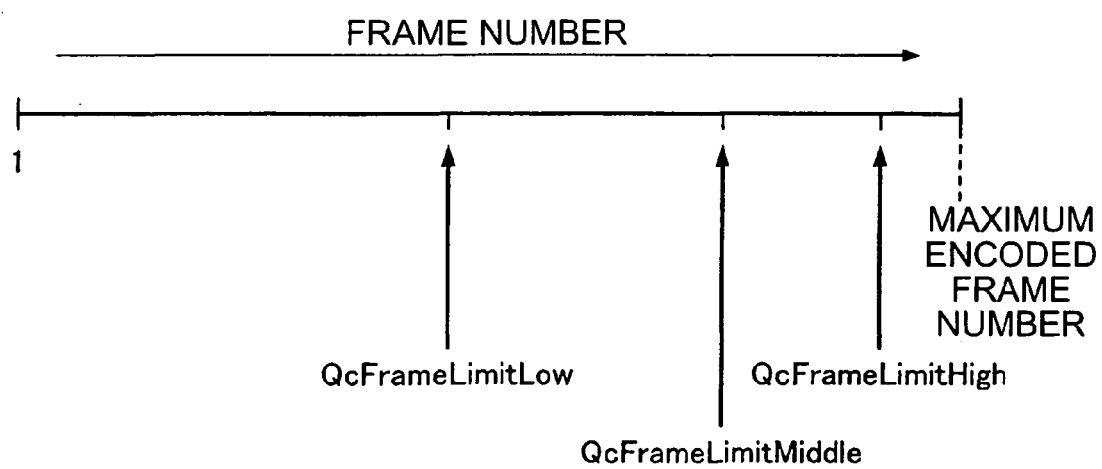
FIG. 14 is a chart for explaining the number of remaining frames.

FIG. 14 shows a diagram for explaining the number of the remaining frames.

Similar to the above, the case is considered in which, for example, image data of moving images with a frame rate of 15 frame per second and encoding time of 10 seconds are generated with a bit rate of 64 k bit per second. In this case, the number of the encoding frames is 150 frames (=15×10). Therefore, the number of the frames which can be encoded while maintaining a predetermined bit rate is found as 150 frames.

It is assumed that, for example, the frame number at the beginning of the encoding of the image data of the moving images is incremented by one from the initial value of "1." In this case, every time the encoded data are generated by encoding each frame, the frame number is incremented towards the maximum encoded frame number of 150. Therefore, the number of remaining frames can be found by subtracting the present frame number from the maximum encoded frame number.

At this point, the rate control section 50 compares each reference frame number of various kinds of reference frame numbers defined within the range of the maximum encoded frame number (for maintaining the bit rate) with the number of remaining frames. In FIG. 14, QcFrameLimitLow, QcFrameLimitMiddle, and QcFrameLimitHigh (1≦QcFrameLimitLow<QcFrameLimitMiddle<QcFrameLimitHigh≦ maximum encoded frame number) are provided as the reference frame numbers. Although three kinds of the reference frame numbers are provided in FIG. 14, two kinds thereof or four or more kinds thereof can also be adopted.

And, the rate control section 50 sets or releases the upper limit threshold of the quantization parameter in accordance with the result of comparison of the number of the remaining frames and each of the reference frame numbers and the number of the remaining usable bits. More specifically, the number of the remaining frames which decreases as the encoding process proceeds is compared with QcFrameLimitLow, QcFrameLimitMiddle, and QcFrameLimitHigh, and the upper limit threshold of the quantization parameter is set or released taking the number of the remaining usable bits at the time of each comparison into consideration. For example, when the number of the remaining frames reaches the reference frame number, the upper limit threshold of the quantization parameter is set if the number of remaining usable bits is judged to be large, but the upper limit threshold of the quantization parameter is released if the number of remaining usable bits is judged to be small.

Note that the rate control section 50, as described below, preferably sets or releases the upper limit threshold of the quantization parameter based on the comparison results of each of the reference bit numbers and the number of the remaining usable bits (the number of assignable bits) and the comparison results of each of the reference frame numbers and the number of remaining frames. By thus arranged, the degradation of the image quality can be prevented while the upper limit threshold of the quantization parameter is set. Meanwhile, while the upper limit threshold of the quantization parameter is released, if the a large number of bits are used in the first half of the encoding process of a series of image data of the moving images, the size of the encoded data can be reduced by releasing the upper limit threshold of the quantization parameter, and as a result, the bit rate can be maintained.

Further, in order for ensuring the maintenance of the bit rate, a skipping process for skipping a frame to be encoded is preferably executed. Therefore, in the present embodiment, as shown in FIG. 8, the image data compression device 10 can include a frame skipping section 60.

The frame skipping section 60 executes the skipping process for skipping the image data generating process in the image data processing section 70. In other words, the frame skipping section 60 stops generating the image data to be supplied to the quantizing section 20.

In the present embodiment, the frame skipping section 60 preferably executes the skipping process when the upper limit threshold of the quantization parameter is released in the rate control section 50. Further, when the frame skipping section 60 executes the skipping process, the skipping process is preferably executed two or more times with at least 1 frame of interval. By thus executed, the bit rate can be maintained even in the case in which the number of the remaining usable bits and the number of the remaining frames are extremely small.

3.3 Specific Example of Quantization Parameter Qc Calculation Process

Hereinafter, the calculation process of the quantization parameter Qc executed in the rate control section 50 will be specifically explained.

Figure 15:
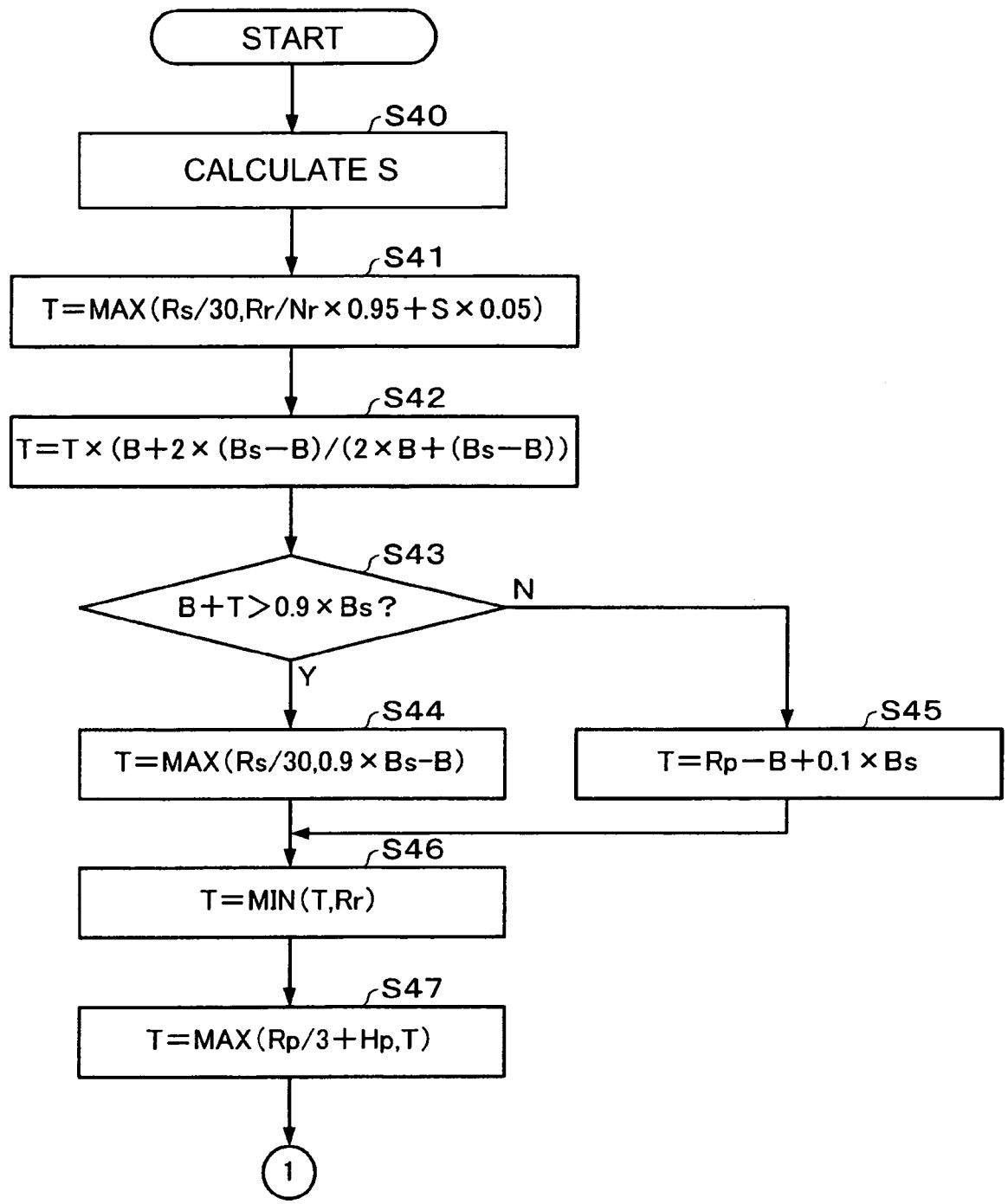
FIG. 15 is a flowchart of the first half of an example of a quantization parameter calculating process.
Figure 16:
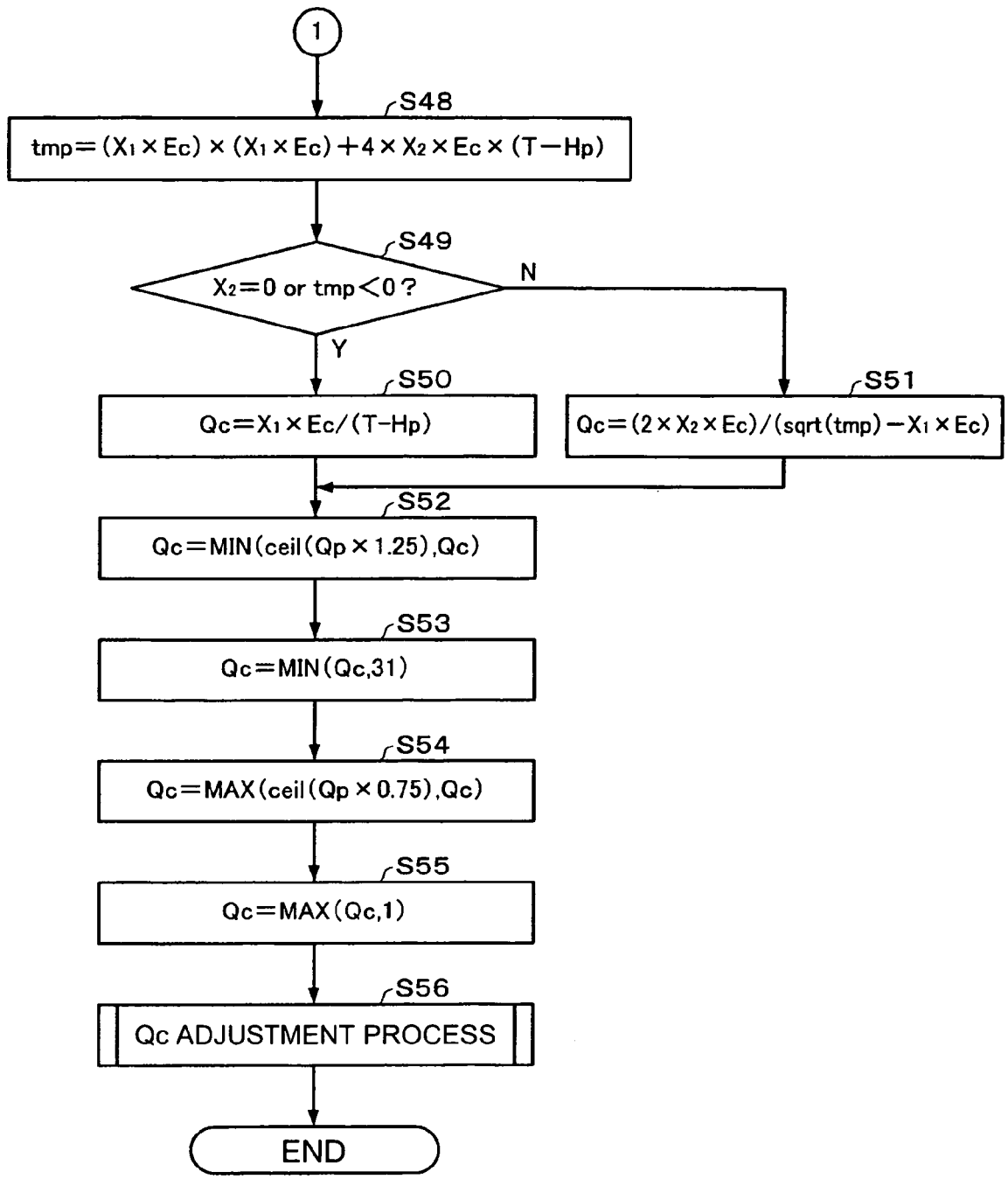
FIG. 16 is a flowchart of the second half of the example of the quantization parameter calculating process.

FIGS. 15 and 16 show an example of the flow of calculation process of the quantization parameter Qc. Here, the flow of the process shown in FIGS. 15 and 16 is explained with reference to a table shown in FIG. 17 for explaining parameters thus used in the calculation process for the quantization parameter Qc. The process flow shown in FIGS. 15 and 16 is executed for every frame.

Firstly, the number of bits S used in the precedent frame is calculated (step S40). In this point, the number of bits used for encoding (the number of bits used for encoding the present frame) Rc found in the precedent frame is set to the parameter S.

FIG. 18 shows an example of the calculation process flow for the value of the number Rc of the bits used for encoding. In this flow, putting xo as the count data read out from the count register 32 as compatible information to the data size of the quantized data in the precedent frame to the present frame, by substituting the value to the equation (1), the predicted data size yo of the encoded data in the present frame is found (step S60).

And, the predicted data size $y_0$ found in the step S60 is set as the value of the number Rc of the bits used for encoding (step S61).

The value of the parameter Rc thus found is set to the parameter S in the succeeding frame.

Returning to FIG. 15, the explanation is continued therefrom. After finding the value of the parameter S, the number T of bits for assigning to the resent frame is then found (step S41). In the step S41, the average number (Rr/Nr) of the bits assigned to one frame is calculated using the number Rr of the remaining usable bits and the number Nr of the remaining frames to be encoded, and then, the number T of bits assigned to the present frame is found from the proportion of the average number to the number S of bits assigned to the precedent frame. In the step S41, the proportion is, for example, 0.95:0.05. And further, the number T of bits assigned to the present frame is arranged not to be less than the lower limit value of Rs/30.

Subsequently, the number T of bits assigned to the present frame is adjusted using the proportion of the number B of bits presently occupied in the FIFO buffer section 30 to the number Bs of bits of the FIFO buffer section 30 (step S42). As a result, the value of the parameter T is increased when the number B of occupied bits in the present FIFO buffer section 30 is smaller than a half of the number Bs of bits of the FIFO buffer section 30, or the value of the parameter T is decreased, on the contrary, when it is greater.

And then, whether or not the summation of the number B of the occupied bits in the present FIFO buffer section 30 and the parameter T exceeds nine-tenths of the number Bs of bits of the FIFO buffer section 30 is judged (step S43). If the summation is judged to exceed nine-tenths of the parameter Bs (step S43: Y), the value of the parameter T is set (clipped) to the value obtained by subtracting the value of the parameter B from nine-tenths of the number Bs of bits of the FIFO buffer section 30 (step S44). In other words, it is set so that the summation of the number B of the occupied bits in the present FIFO buffer section 30 and the parameter T does not exceed nine-tenths of the number Bs of bits of the FIFO buffer section 30. Further, similarly to the step S41, the parameter T is arranged not to be less than the lower limit value of Rs/30.

Meanwhile, if the summation is judged not to exceed nine-tenths of the parameter Bs in the step S43 (step S43: N), the value of the parameter T is set to the value obtained by subtracting the value of the parameter B from the average number Rp of bits generated for each frame and then adding one-tenth of the value of the parameter Bs (step S45). In other words, it is set so that the value obtained by subtracting the average number Rp of bits generated for each frame from the summation of parameter Bs and the parameter T is not less than one-tenth of the number Bs of bits of the FIFO buffer section 30.

Subsequently to the step S44 or the step S45, the value of the parameter T is set so as not to be greater than the number Rr of the remaining usable bits (step S46). Subsequently, the value of the parameter T is adjusted so as not to drastically vary among the frames (step S47).

And then, in order for finding the value of the quantization parameter Qc, the model equation shown in FIG. 6 is solved as a quadratic equation for the parameter Qc. On that account, as shown in FIG. 16, the value of the parameter tmp is firstly found (step S48).

Here, if the model parameter $X_2$ is 0 or the value of the parameter tmp is negative (step S49: Y), the quantization parameter Qc is found from the model equation as a linear equation (step S50). In this case, since the parameter R becomes a value obtained by subtracting the number Hp of bits used in the precedent frame other than information such as a header from the number T of bits assigned to the present frame, it can be calculated from the following equation. $Qc = x_1 \times Ec/(T-Hp)$ Further, the value of the parameter Ec is, as shown in FIG. 6, the value of the average of absolute values of the pixels of the frame.

If the model parameter X2 is not 0 and the value of the parameter tmp is greater than 0 in the step S49 (step S49: N), the value of the quantization parameter Qc is defined as the solution of the quadratic equation derived from the model equation shown in FIG. 6 (step S51).

Subsequently to the step S50 or the step S51, the value of the quantization parameter Qc is processed so that the difference from the quantization parameter Qp of the precedent frame falls within 25 percent thereof and the value of the quantization parameter Qc is in a range of 1 through 31 (step S52, step S53, step S54, and step S55). In the steps S52, S54, ceil (x) means that x is rounded-up in the positive direction to be an integer.

In the present embodiment, a process for adjusting the value of the quantization parameter Qc found in step S55 is further executed (step S56), and the series of processes is terminated (END).

Figure 19:
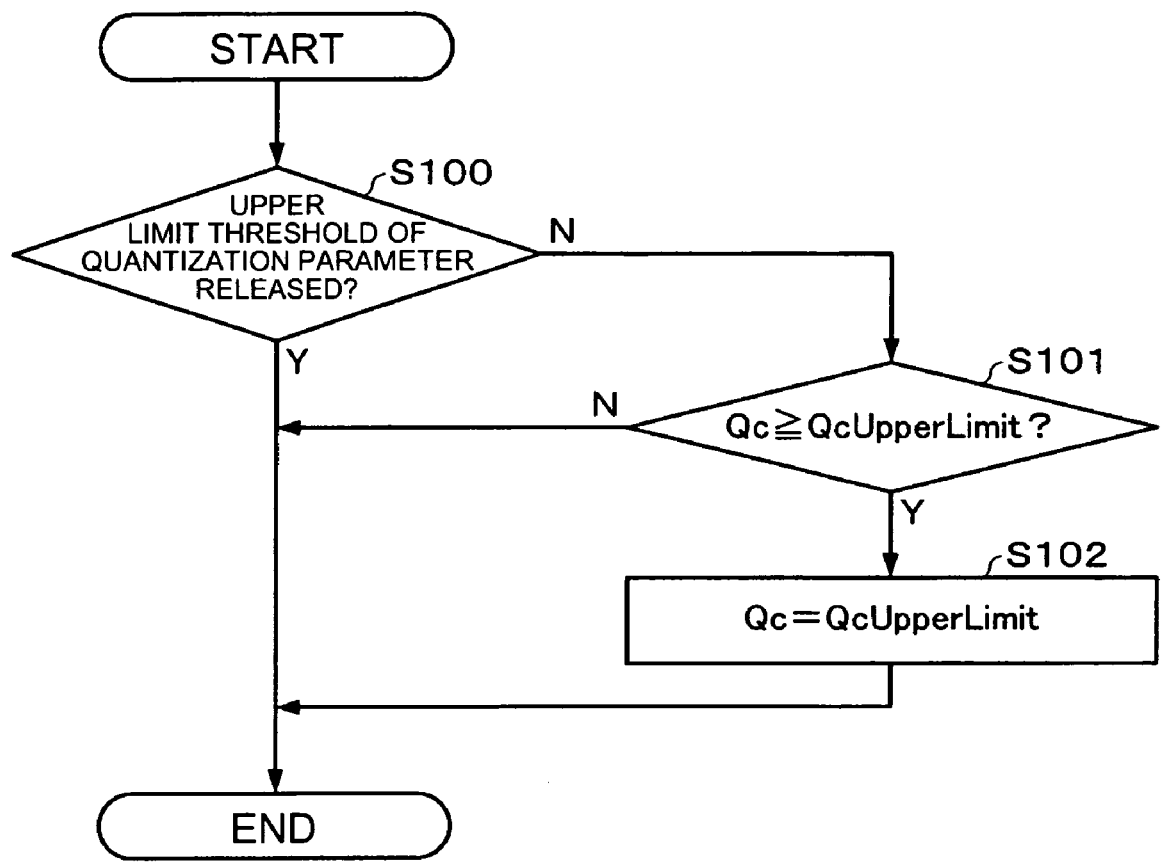
FIG. 19 is a flowchart of an example of the quantization parameter adjusting process.

FIG. 19 shows an example of the flow of the process for adjusting the value of the quantization parameter Qc.

Firstly, whether the upper limit threshold of the quantization parameter is set or released is judged (step S100). The process of judging whether the upper limit threshold is set or released is executed by the rate control section 50. The rate control section 50 executes this judgment process based on the number of bits assignable to the compressing process, the number of remaining frames, or both of the number of bits assignable to the compressing process and the number of remaining frames.

If the upper limit threshold of the quantization parameter is judged to be released in the step S100 (step S100: Y), the series of processes is terminated to use the value of the quantization parameter Qc found in step S55 without any changes (END in FIG. 19, END in FIG. 16).

If the upper limit threshold of the quantization parameter is judged to be set in the step S100 (step S100: N), whether or not the value of the quantization parameter Qc found in step S55 is equal to or greater than the upper limit threshold QcUpperLimit of the quantization parameter whose value is set prior to this adjusting process is judged (step S101).

If the value of the quantization parameter Qc is judged to be equal to or greater than the upper limit threshold QcUpperLimit of the quantization parameter (step S101: Y), the value of the quantization parameter Qc is set to be the upper limit threshold QcUpperLimit of the quantization parameter (step S102), and then the series of processes is terminated (END).

If the value of the quantization parameter Qc is judged to be smaller than the upper limit threshold QcUpperLimit of the quantization parameter (step S101: N), the series of processes is terminated to use the value of the quantization parameter Qc found in step S55 without any changes (END).

The rate control section 50 executes the following judging process to set or release the upper limit threshold of the quantization parameter.

Figure 20:
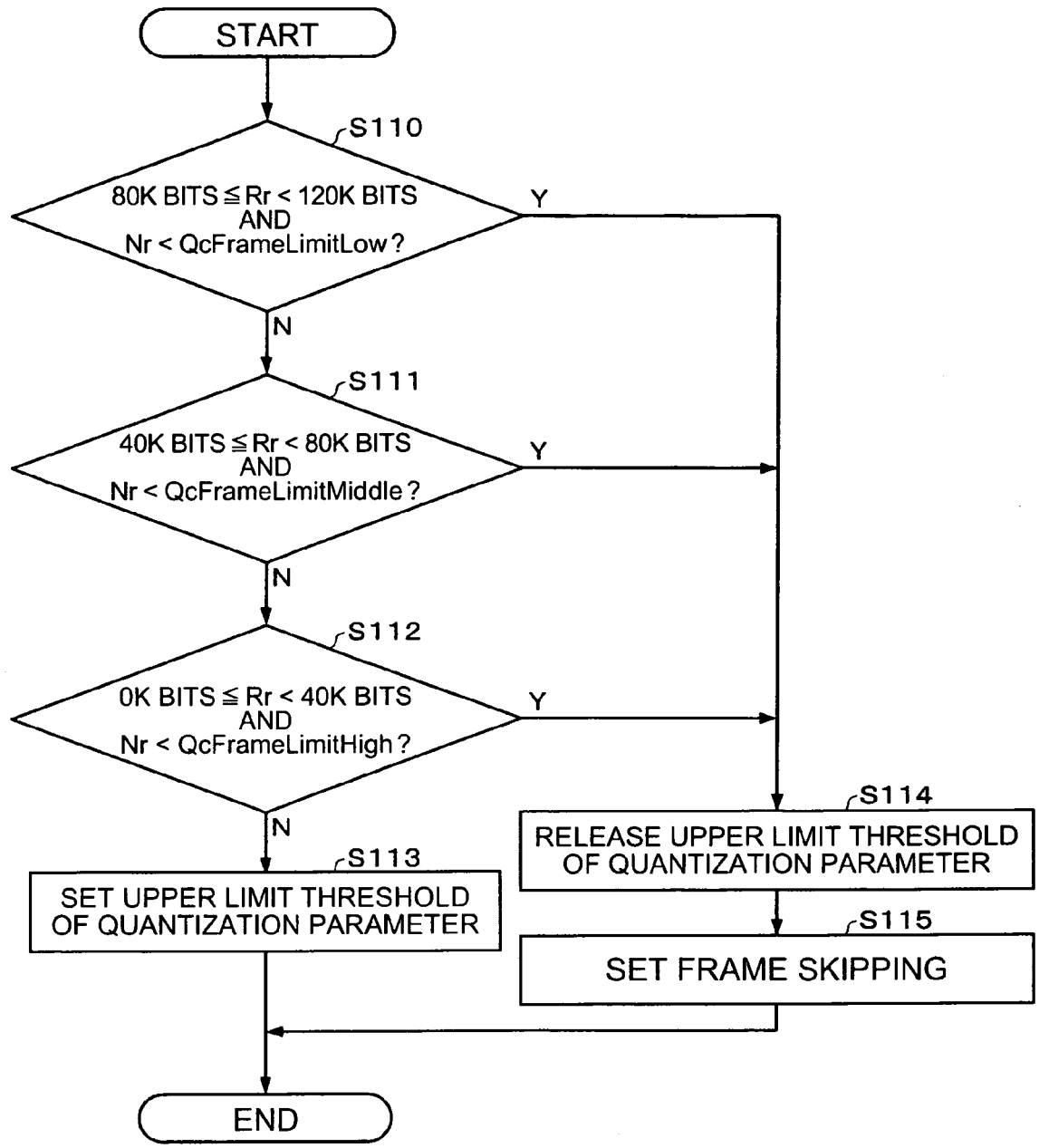
FIG. 20 is a flowchart of an example of a process for judging whether the upper limit of the quantization parameter is set or released.

FIG. 20 shows an example of the flow of the process for judging whether the upper limit threshold of the quantization parameter should be set or release. The process of FIG. 20 is executed prior to the step S100 in FIG. 19. Note that FIG. 20 shows the flow of the process in which the frame skipping function is set so that the frame skipping section 60 executes the skipping process when the upper limit threshold of the quantization parameter is released. Further, FIG. 20 shows a process using the reference bit numbers and the reference frame numbers shown in FIGS. 13 and 14.

Firstly, the rate control section 50 judges whether or not the number Rc of the remaining usable bits (See FIG. 17 for reference.) is equal to or greater than 80 k bits (10 k bytes) and is less than 120 k bits (15 k bytes), and the number Nr of remaining frames to be encoded (See FIG. 17 for reference.) is less than QcFrameLimitLow (step S110).

If the number Rc of the remaining usable bits is judged to be less than 80 k bits or equal to or greater than 120 k bits, or the number Nr of the remaining frames to be encoded is judged to be greater than QcFrameLimitLow in step S110 (step S110: N), the process proceeds to the step S111.

In the step S111, whether or not the number Rc of the remaining usable bits is equal to or greater than 40 k bits (5 k bytes) and is less than 80 k bits, and the number Nr of the remaining frames to be encoded is less than QcFrameLimit-Middle is judged.

If the number Rc of the remaining usable bits is judged to be less than 40 k bits or equal to or greater than 80 k bits, or the number Nr of the remaining frames to be encoded is judged to be greater than QcFrameLimitMiddle in step S111 (step S111: N), the process proceeds to the step S112.

In the step S112, whether or not the number Rc of the remaining usable bits is equal to or greater than 0 k bit and is less than 40 k bits, and the number Nr of the remaining frames to be encoded is less than QcFrameLimitHigh is judged.

If the number Rc of the remaining usable bits is judged to be not less than 40 k bits or the number Nr of the remaining frames to be encoded is judged to be not less than QcFrame-LimitHigh in the step S112 (step S112: N), the process of setting the upper limit threshold of the quantization parameter is executed (step S113), and the series of processes is terminated (END). As an example of the process for setting the upper limit threshold of the quantization parameter, a flag for releasing the upper limit threshold of the quantization parameter is reset. By providing such a flag for releasing the upper limit threshold of the quantization parameter, whether the upper limit threshold of the quantization parameter is set or released is easily judged in step S100.

If the number Rc of the remaining usable bits is judged to be not less than 80 k bits or less than 120 k bits, and the number Nr of the remaining frames to be encoded is judged to be less than QcFrameLimitLow in step S110 (step S110: Y), a process for releasing the upper limit threshold of the quantization parameter is executed (step S114). As an example of the process for releasing the upper limit threshold of the quantization parameter, the flag for releasing the upper limit threshold of the quantization parameter is set. Subsequently, the frame skipping setting is executed (step S115) to end the series of processes (END). The frame skipping section 60 executes skipping process based on the content of the frame skipping setting in step S115.

In the frame skipping setting in the step S115, the setting for skipping the image data generating process of the present frame in the image data processing section 70 is executed. According to the frame skipping setting, it is arranged to be able to, for example, initialize at least a part of the image data processing section 70, or to stop at least a part of the operation clock. The present invention is not limited to the above content of the frame skipping setting for executing the skipping process, and it is enough to prevent the encoded data from being generated in consequence.

If the number Rc of the remaining usable bits is judged to be not less than 40 k bits and less than 80 k bits, and the number Nr of the remaining frames to be encoded is judged to be less than QcFrameLimitMiddle in step S111 (step S111: Y), the process proceeds to the step S114.

If the number Rc of the remaining usable bits is judged to be not less than 0 k bit and less than 40 k bits, and the number Nr of the remaining frames to be encoded is judged to be less than QcFrameLimitHigh in step S112 (step S112: Y), the process proceeds to the step S114.

As described above, the rate control section 50 judges whether the upper limit threshold of the quantization parameter should be set or released based on the number of bits assignable to the compressing process and the number of remaining frames.

Note that the rate control section 50 can find the value of the quantization parameter Qc so as to be not less than the lower limit threshold QcLowerLimit of the quantization parameter whose value is determined prior to the adjusting process in addition to the process of FIG. 19. Namely, if the lower limit threshold QcLowerLimit of the quantization parameter whose value is settable is set, the rate control section 50 can find the quantization parameter, using the predicted data size, so as to be not greater than the upper limit threshold QcUpperLimit of the quantization parameter and not less than the lower limit threshold QcLowerLimit of the quantization parameter. And further, the rate control section 50 can be arranged to, when releasing the upper limit threshold QcUpperLimit of the quantization parameter, further release the lower limit threshold QcLowerLimit of the quantization parameter, and find the quantization parameter in dependent of the upper limit threshold QcUpperLimit of the quantization parameter and the lower limit threshold QcLowerLimit of the quantization parameter.

Figure 21:
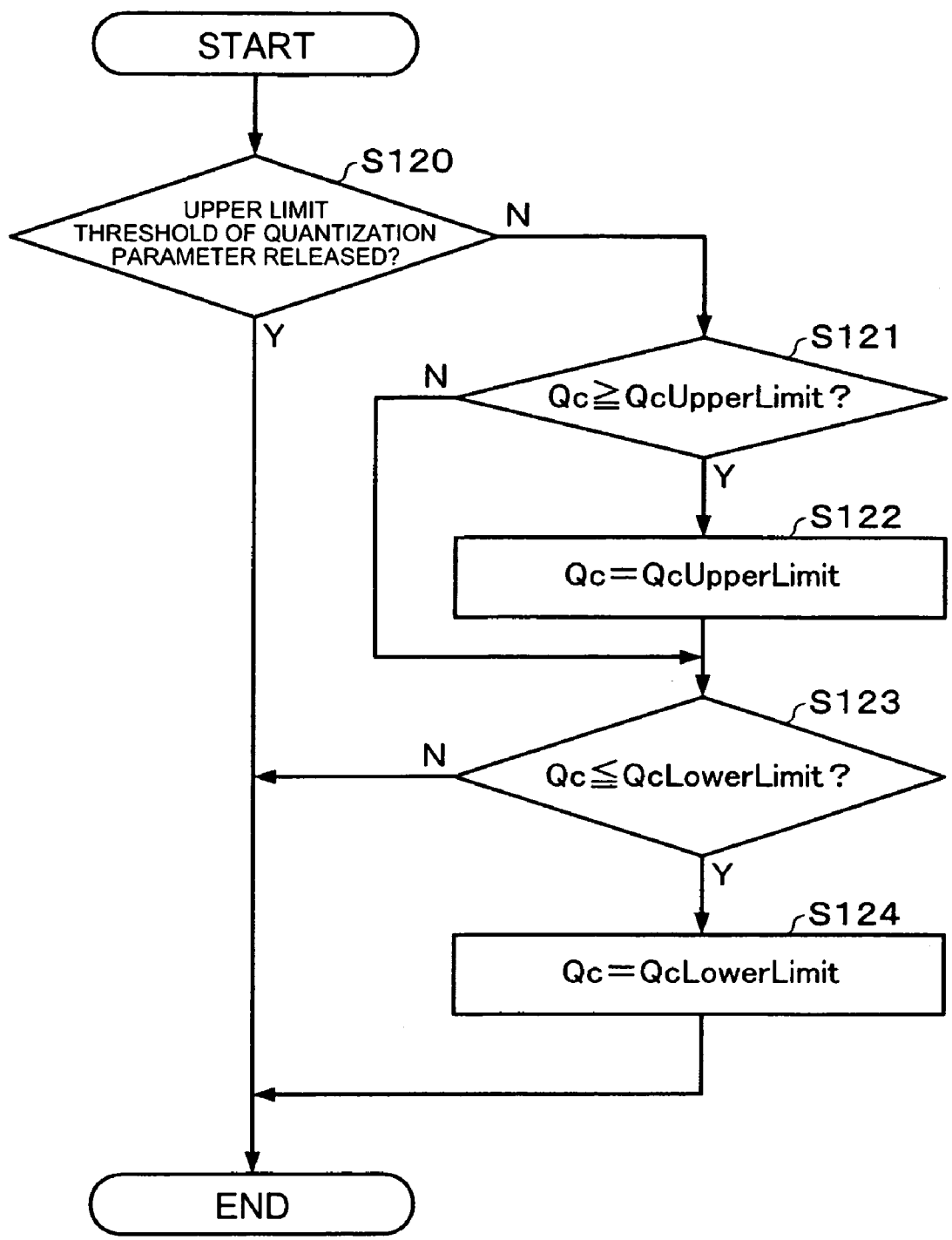
FIG. 21 is a flowchart of another example of the process for judging whether the upper limit of the quantization parameter is set or released.

FIG. 21 shows another example of the flow of the process for adjusting the value of the quantization parameter Qc. Here, an example of a process in which both the upper limit threshold QcUpperLimit of the quantization parameter and the lower limit threshold QcLowerLimit of the quantization parameter are set.

Firstly, whether the upper limit threshold of the quantization parameter is set or released is judged (step S120). If the upper limit threshold of the quantization parameter is judged to be set (step S120: N), whether or not the value of the quantization parameter Qc found in step S55 is equal to or greater than the upper limit threshold QcUpperLimit of the quantization parameter whose value is set prior to this adjusting process is judged (step S121).

If the value of the quantization parameter Qc is judged to be equal to or greater than the upper limit threshold QcUpperLimit of the quantization parameter (step S121: Y), the value of the quantization parameter Qc is set to be the upper limit threshold QcUpperLimit of the quantization parameter (step S122), and then the process proceeds to step S123.

If the value of the quantization parameter Qc is judged to be less than the upper limit threshold QcUpperLimit of the quantization parameter (step S121: N), the process proceeds to step S123.

Subsequently, whether or not the value of the quantization parameter Qc is equal to or less than the lower limit threshold QcLowerLimit of the quantization parameter (step S123). If the value of the quantization parameter Qc is judged to be equal to or less than the lower limit threshold QcLowerLimit of the quantization parameter (step S123: Y), the value of the quantization parameter Qc is set to be the lower limit threshold QcLowerLimit of the quantization parameter (step S124).

If the value of the quantization parameter Qc is judged to be greater than the lower limit threshold QcLowerLimit of the quantization parameter (step S123: N), the value of the quantization parameter Qc at that moment is supplied to the quantizing section 20 (END in FIG. 21, END in FIG. 16).

Meanwhile, if the upper limit threshold of the quantization parameter is judged to be released (step S120: Y), the series of processes is terminated (END). Namely, if the lower limit threshold QcLowerLimit of the quantization parameter is set, the rate control section 50, when releasing the upper limit threshold QcUpperLimit of the quantization parameter, further releases the lower limit threshold QcLowerLimit of the quantization parameter, and finds the quantization parameter independently of the upper limit threshold QcUpperLimit of the quantization parameter and the lower limit threshold QcLowerLimit of the quantization parameter. But, since the upper limit value of the quantization parameter Qc is set to be 31 in step S53, it never exceeds the value.

By supplying the quantizing section 20 with the quantization parameter Qc found as described above, the quantization step of the quantizing section 20 can be varied.

Figure 22:
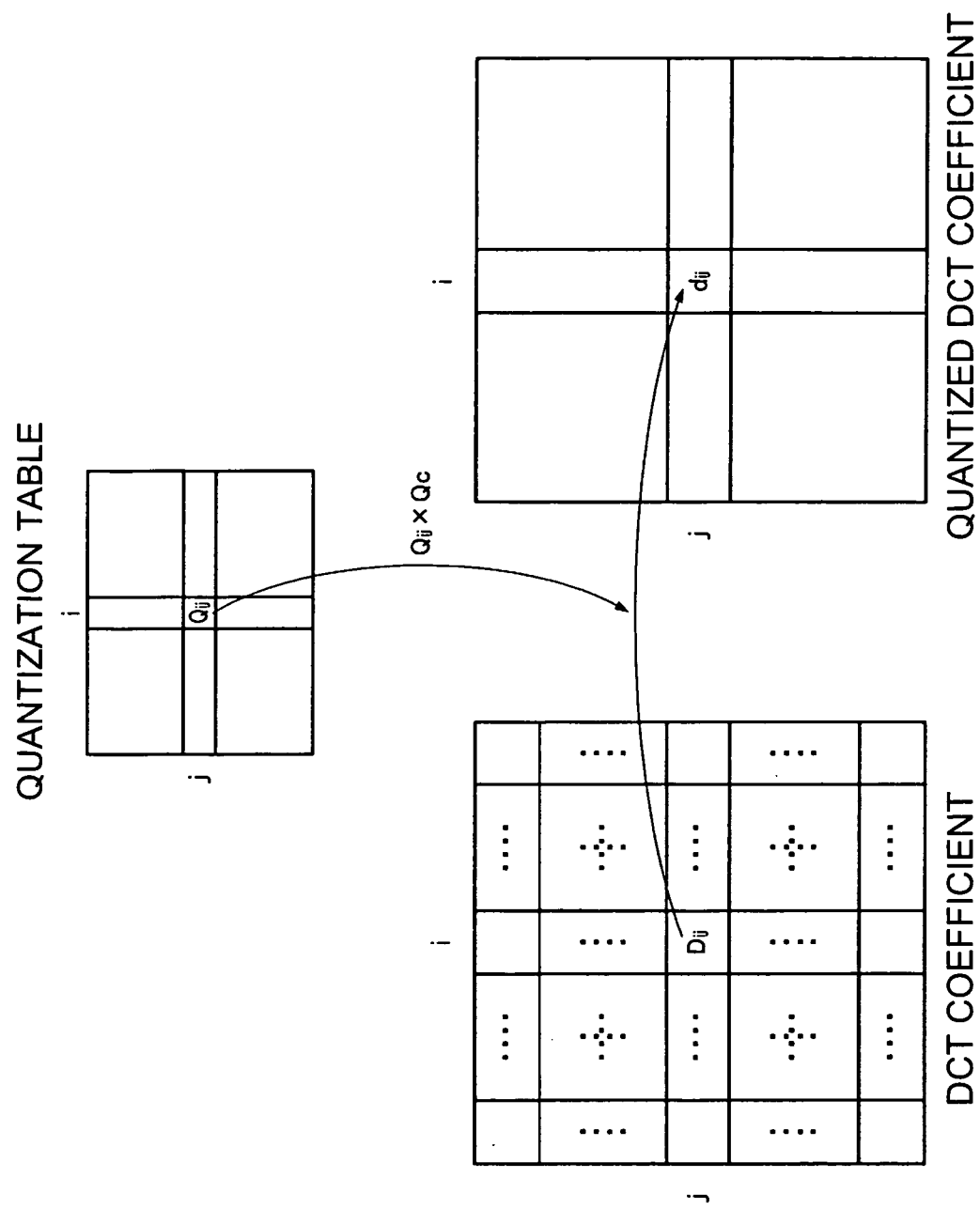
FIG. 22 is a chart for explaining a quantizing process of the present embodiment.

Namely, as shown in FIG. 22 for example, the quantized DCT coefficients dij are found by respectively dividing the DCT coefficients Dij of the image data expressed by the DCT coefficients by the products of the quantization step value Qij at the corresponding position of the quantization table and the quantization parameter Qc. As a result, the number of zero data in the quantized DCT coefficients can be increased or decreased.

3.4 Example of Configuration

Figure 23:
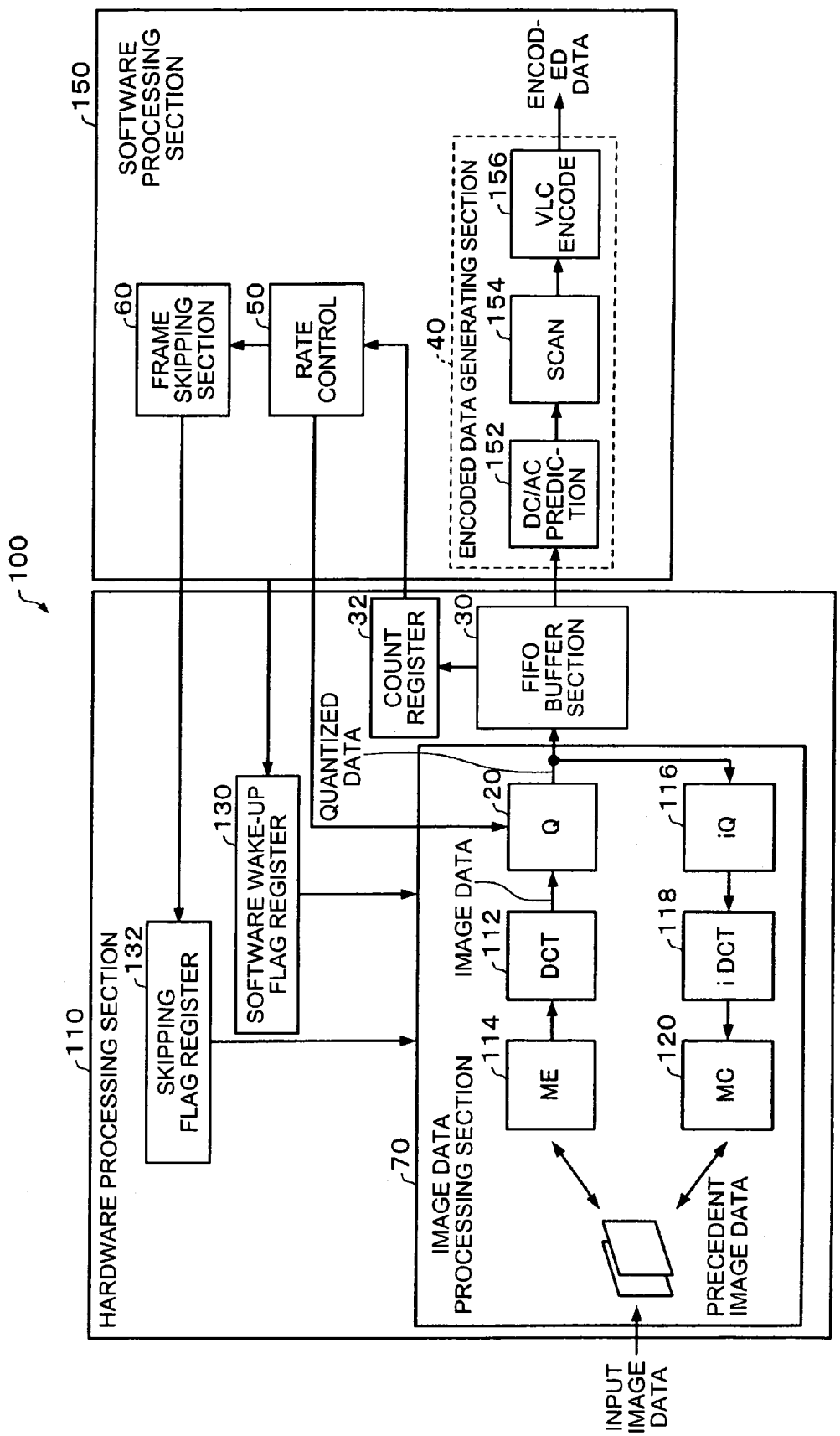
FIG. 23 is a detailed functional block diagram of the image data compression device of the present embodiment.

FIG. 23 shows a detailed functional block diagram of the image data compression device according to the present embodiment. Note that the same parts as those of the image data compression device 10 shown in FIG. 8 are denoted with the same reference numerals and explanations therefore are omitted if appropriate.

The image compression device 100 shown in FIG. 23 executes a compressing process of image data of moving images compliant with MPEG-4. The image data compression device 100 includes a hardware processing section 110 and a software processing section 150.

The hardware processing section 110 processes the image data of moving images by hardware. The hardware processing section 110 includes the image data processing section 70 including the quantizing section 20, the FIFO buffer section 30, a software wake-up flag register 130, and a skipping flag register 132. The hardware processing section 110 is realized by hardware such as ASIC or a dedicated circuit without using software.

The software processing section 150 executes an encoding process by software on the quantized data retrieved from the FIFO buffer section 30 to generate the encoded data. The software processing section 150 includes the encoded data generating section 40, the rate control section 40, and the frame skipping section 60. The software processing section 150 is a processing section whose functions are realized by software (firmware), and the functions are realized by CPU or the like (hardware) installed with software (firmware).

More specifically, the image data processing section 70 of the hardware processing section 110 includes a discrete cosine transforming section 112, a motion estimating section 114, an inverse-quantizing section 116, an inverse-DCT section 118, and a motion compensating section 120. The DCT section 112 executes the process of the step S2 shown in FIG. 1A. The motion estimating section 114 executes the process of the step S1 shown in FIG. 1A. The inverse-quantizing section 116 executes the process of the step S4 shown in FIG. 1A. The inverse-DCT section 118 executes the process of the step S5 shown in FIG. 1A. The motion compensating section 120 executes the process of the step S6 shown in FIG. 1A.

Namely, the hardware processing section 110 outputs the difference between the input image data of the present frame and the precedent image data of the precedent frame to the present frame as the motion vector information, and executes the discrete cosine transform on the motion vector information to output it as the image data to the quantizing section. Further, the precedent image data described above are processed base on the inverse-quantized data obtained by inverse-quantizing the quantized data.

And, when the software wake-up flag register 130 is set, the process of the hardware processing section 110 as described above is commenced. The software wake-up flag register 130 is set by the software processing section 150. More specifically, in an interrupting process indicating commencement of input image data supply, the software processing section 160 sets the software wake-up flag register 130 (sets the software wake-up flag information to the set state).

Further, when the skipping flag register 132 is set, the image data generating process is skipped in the image data processing section 70. More specifically, when the frame skipping section 60 judges that the skipping process should be executed according to the above conditions, the software processing section 150 (frame skipping section 60) sets the skipping flag register 132 (sets the skipping flag information to the set state). The skipping flag register 132 is set to the reset state once in every frame. In this case, the skipping flag register can be reset (set to the reset state) by hardware, or can be reset in every frame by the software processing section 150.

Note that the hardware processing section 110 does not need to be composed of all of these sections, and at least one of the sections described above can be omitted from the configuration.

The encoded data generating section 40 of the software processing section 150 includes a DC/AC predicting section 152, a scanning section 154, and a VLC encoding section 156. The DC/AC predicting section 152 executes the process of the step S7 shown in FIG. 1A. The scanning section 154 executes the process of the step S8 shown in FIG. 1A. The VLC encoding section 156 executes the process of the step S9 shown in FIG. 1A.

Note that the software processing section 150 does not need to be configured with all of these sections, and at least one of the sections described above can be omitted from the configuration. For example, the software processing section 150 can be configured to encode the quantized data retrieved from the FIFO buffer section 30 to the variable length codes. Further, the software processing section 150 can be configured to execute a scanning process for reordering the quantized data retrieved from the FIFO buffer section 30 to encode the result of the scanning process to the variable length codes. Further, the software processing section 150 can be configured to execute a scanning process for finding a DC component and an AC component from the quantized data retrieved from the FIFO buffer section 30 and then reordering the DC component and the AC component to encode the result of the scanning process to the variable length codes.

Incidentally, in the present embodiment, the reason for processing the steps S1 through S6 in FIG. 1A by hardware and the steps S7 through S10 by software is as follows. Firstly, after quantizing in the step S3 of FIG. 1A there are overwhelmingly majority of zero data in each block as shown in FIG. 5, and accordingly, the number of kinds of the amount of information is overwhelmingly small in comparison with the data before quantization (FIG. 3). Moreover, since the loads by the operations themselves in steps S7 through S10 are also light, if the steps S7 through S10 in FIG. 1A are processed by software, the loads by the processes are small. On the contrary, in FIG. 1A, the quantization in the step S3, the DCT in the step S2, and the inverse-DCT in the step S5 handle a large amount of information in complicated operations, and accordingly cause too large burden for software to process. Although the quantization, the DCT, the inverse-DCT, and the motion estimation are processes with heavy loads, they have little necessity of modification because of firm standards, and further, the steps S1 through S6 of FIG. 1A including repetitive processes are suited to be processed by hardware. Further, as described above, since the amount of quantized data processed by the hardware processing section 110 is small, the amount of data transferred from the hardware processing section 110 to the software processing section 150 is also small, thus unburdening the data transfer control.

Figure 24:
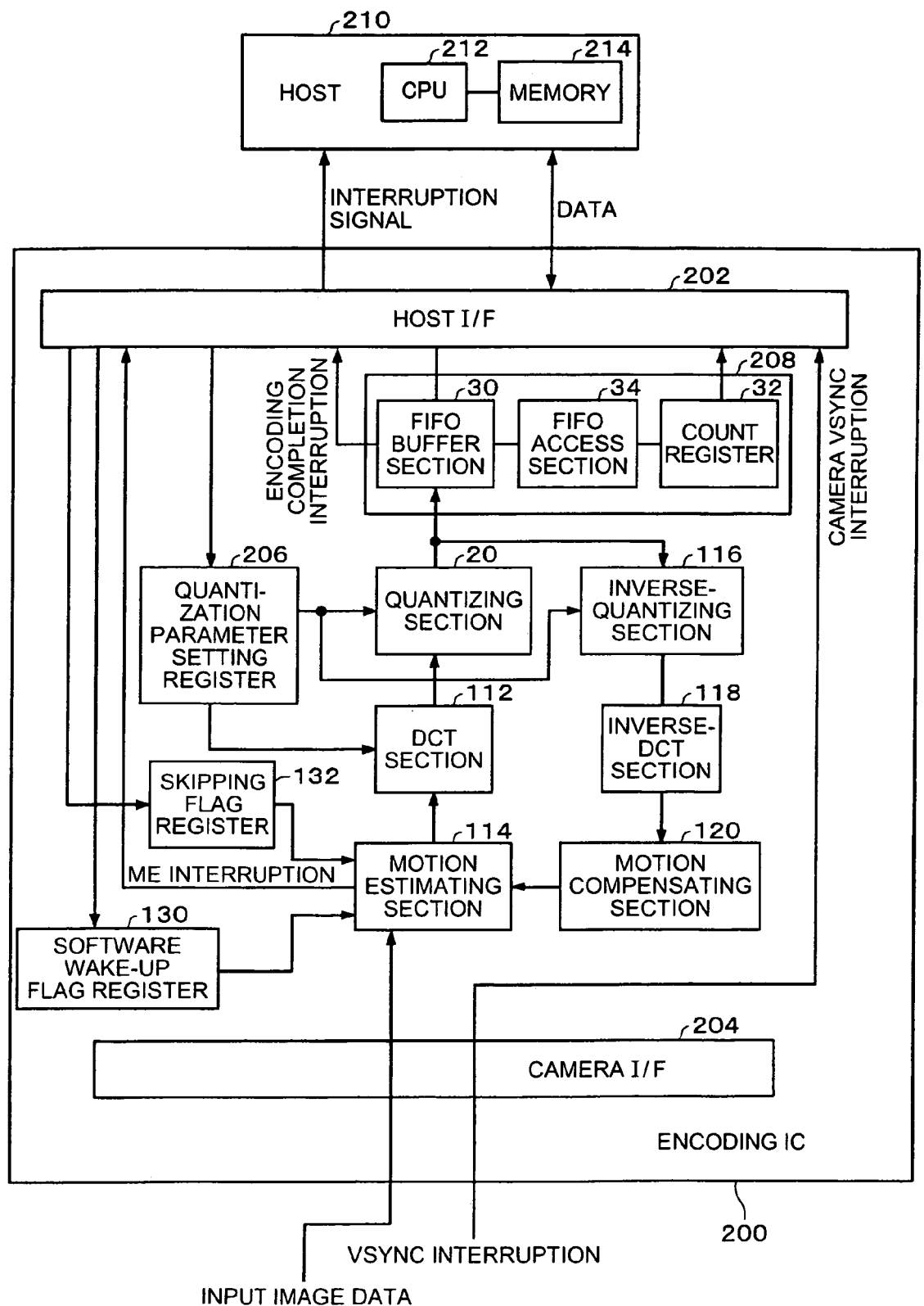
FIG. 24 is a diagram showing an example of a hardware configuration of the image data compression device of FIG. 23.

FIG. 24 shows an example of a hardware configuration of the image data compression device 100. Here, the hardware processing section 110 shown in FIG. 23 is integrated, and is mounted on a semiconductor device as an encoding IC (integrated circuit) (an encoder in a broad sense) 200. Further, the functions of the software processing section 150 are realized by a host 210. Note that, in FIG. 24, the same parts as those of the hardware processing section 110 shown in FIG. 23 are denoted with the same reference numerals and explanations therefor are omitted if appropriate.

The host 210 includes a CPU 212 and a memory 214. The memory 214 stores a program for realizing the functions of the encoded data generating section 40, the rate control section 50, and frame skipping section 60. The CPU 212 realizes the functions of the encoded data generating section 40, the rate control section 50, and frame skipping section 60 by retrieving the program stored by the memory 214 and then processing in accordance with the program.

Here, the encoding IC 200 performs encoding process by MPEG-4 standard on the image data of moving images obtained by picking-up in a camera module (image pick-up section in a broad sense) not shown, and generates the encoded data at a constant rate. Therefore, the encoding IC 200 includes, in addition to the circuit for realizing the functions of various sections of the hardware processing section 110 shown in FIG. 23, a host interface (I/F) 202, a camera I/F (image input interface in a broad sense) 204, a quantization parameter setting register 206, the software wake-up flag register 130, and the skipping flag register 132.

The skipping flag register 132 is set in a process by the host 210. When the skipping flag register 132 is set, the image data generating process is skipped in the image data processing section 70. In FIG. 24, the image generating process in the image data processing section 70 is arranged to be skipped by initializing the internal state of the motion estimating section 114 when the skipping flag 132 is set.

Figure 25:
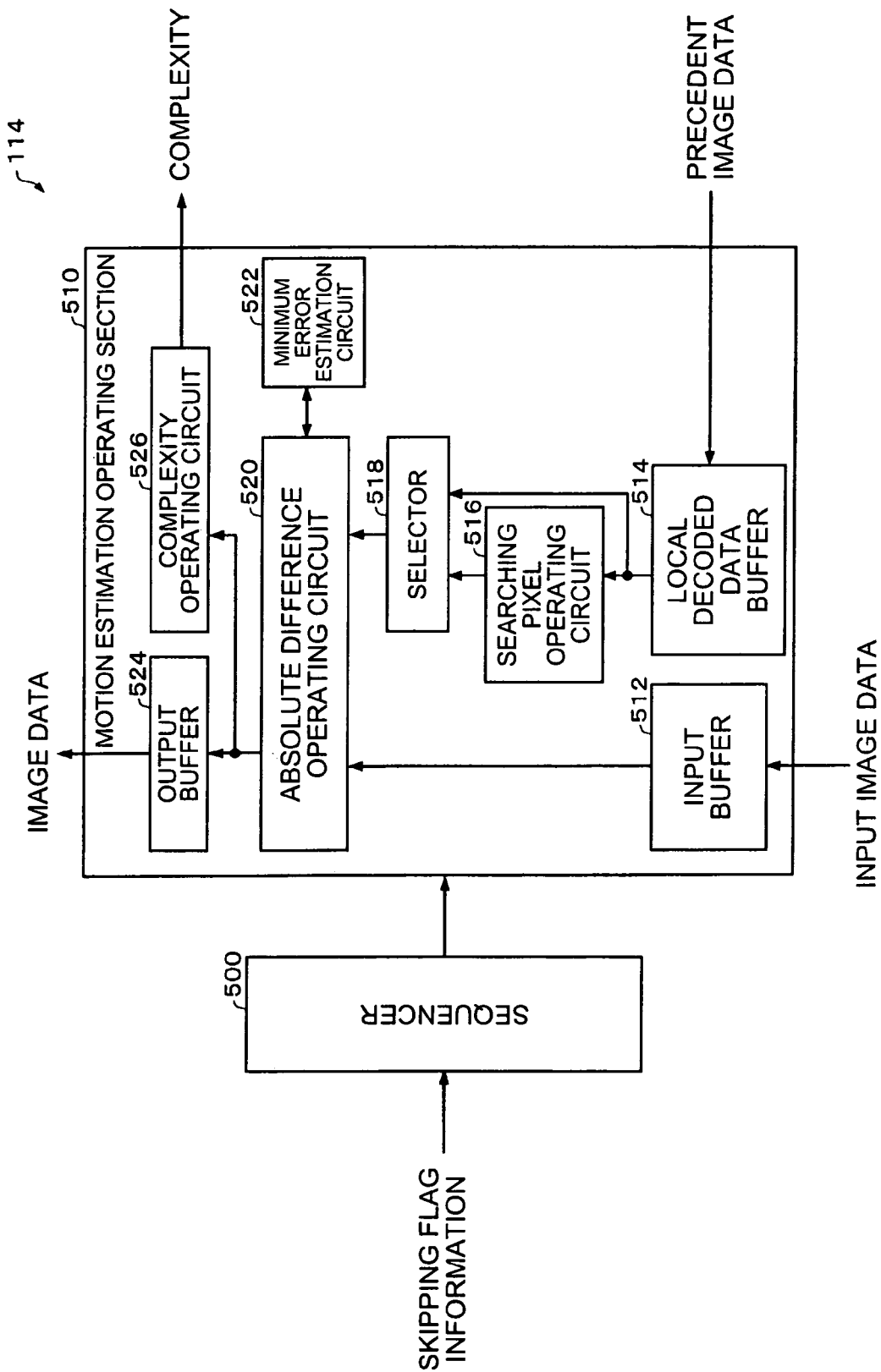
FIG. 25 is a diagram showing an example of a hardware configuration of a motion estimating section.

FIG. 25 shows an example of a hardware configuration of the motion estimating section 114 shown in FIG. 24. The present invention is not limited to the configuration of the motion estimating section 114 shown in FIG. 114.

The motion estimating section 114 includes a sequencer 500 and a motion estimation operating section 510. The motion estimation operating section 510 operates motion vector information and so on based on a control signal from the sequencer 500, and outputs them to the DCT section 112 as image data. The sequencer 500 is arranged to change among a plurality of predetermined state while outputting the control signal in each state to control various sections of the motion estimation operating section 510 whereby controlling a process for motion estimation.

In the motion estimation operating section 510, the input image data are stored in a input buffer 512. Further, the precedent image data from the motion compensating section 120 are stored in a local decoded data buffer 514. The motion estimating section 114 outputs the motion vector information with the minimum sum of absolute differences between the corresponding pixels of the input image data and the precedent image data. Therefore, a searching pixel operating circuit 516 finds the value of the searching pixels (e.g., an average of the luminance compositions of adjacent two or four pixels) with respect to the pixels of the precedent image data stored in the local decoded data buffer 514. And then, a selector 518 outputs from either the searching pixel operating circuit 516 or the local decoded data buffer 514.

An absolute difference operating circuit 520 finds the sum of absolute differences between pixels of input image data stored in the input buffer 512 and pixels of the output from the selector 518 with respect to, for example, each macro block. A minimum error estimation circuit 522 estimates whether or not the sum of absolute differences is the minimum. And, if the minimum error estimation circuit 522 judges that the operation result of the absolute difference operating circuit 520 is the minimum, the result is output to an output buffer 524. Namely, according to the estimation by the minimum error estimation circuit 522, the pixel values of the precedent image data or the values of the searching pixels are repeatedly operated so that the operation result of the absolute difference operating circuit 520 becomes the minimum.

The motion vector information thus output to an output buffer 524 is supplied to the DCT section 112 as the image data. Further, a complexity operating circuit 526 is arranged to be able to find the complexity Ec, as described above, to output the complexity Ec to the host 210.

The skipping flag information of the skipping flag register 132 is input to the sequencer 500 of the motion estimating section 114. And, when the skipping flag information is set to the set state, the sequencer 500 resets the internal state of the motion estimation operating section 510 to the initial state. Namely, the motion estimating section 114 is arranged to be able to promptly stop the motion estimation process when the skipping flag register 132 is set.

In the present embodiment, despite the presence of the FIFO buffer section 30 as described above, the data size of the decoded data is predicted from the number of access to the FIFO buffer section 30 as the predicted data size, and the bit rate can be controlled based on the predicted data size. Furthermore, if it is judged that a predetermined bit rate cannot be realized, the process of the motion estimating section 114 can be stopped to skip the image data generating process. In other words, the predicted data size of the encoded data of the precedent frame from the data size of the quantized data of the precedent frame to the present frame is found, thus it becomes possible to skip the image data generation process of the present frame based on the predicted data size.

In FIG. 25, the encoding IC 200 includes a FIFO section 208. The FIFO section 208 includes the FIFO buffer section 30, the count register 32, and the FIFO access section 34. The FIFO access section 34 performs a control for writing the quantized data from the quantizing section 20 into the FIFO buffer section 30 and executes a process for updating the count data held in the count register 32. More specifically, the FIFO access section 34 performs a control for writing the quantized data into the FIFO buffer section 30 by a predetermined number of bytes. Further, the FIFO access section 34 executes a process for incrementing the count data to update the count register 32 every time it performs the writing control into the FIFO buffer section 30. And, the count register 32 stores the information of the number of times of writing (number of times of access) corresponding to the data size of the quantized data when the quantized data for one frame are written to the FIFO buffer section 30.

The encoding IC 200 and the host 210 realize the function of the image compression device shown in FIG. 8 or FIG. 23 by communicating the interrupting signals and the data.

The host I/F 202 performs an interfacing process with the host 210. More specifically, the host I/F 202 generates an interrupting signal from the encoding IC to the host 210 or controls communication of data between the host 210 and the encoding IC 200. The host I/F 202 is connected to the FIFO buffer section 30 and the count register 32.

The camera I/F 204 performs an interfacing process for inputting the image data of moving images from the camera module which is not shown. The camera I/F 204 is connected to the motion estimating section 114.

The camera module not shown supplies the image data of moving images obtained by picking-up the images to the encoding IC 200 as the input image data. In this case, the camera module also supplies the encoding IC 200 with a VSYNC signal (vertical sync signal) for designating boundaries of frames of the input data. The encoding IC 200 notifies the host 210 as camera VSYNC interruption via the host I/F 202 when the camera I/F 204 accepts the VSYNC signal from the camera module as VSYNC interruption. Thus, the host 210 can execute a given additional process prior to commencement of encoding.

In FIG. 24, in the stage in which the motion estimation is executed, the quantized data corresponding at least one frame are written in the FIFO buffer section 30. When the motion estimation by the motion estimating section 114 is completed, the motion estimating section 114 notifies the host 210 via the host I/F 202 of a motion estimation completion interruption (ME interruption).

Figure 26:
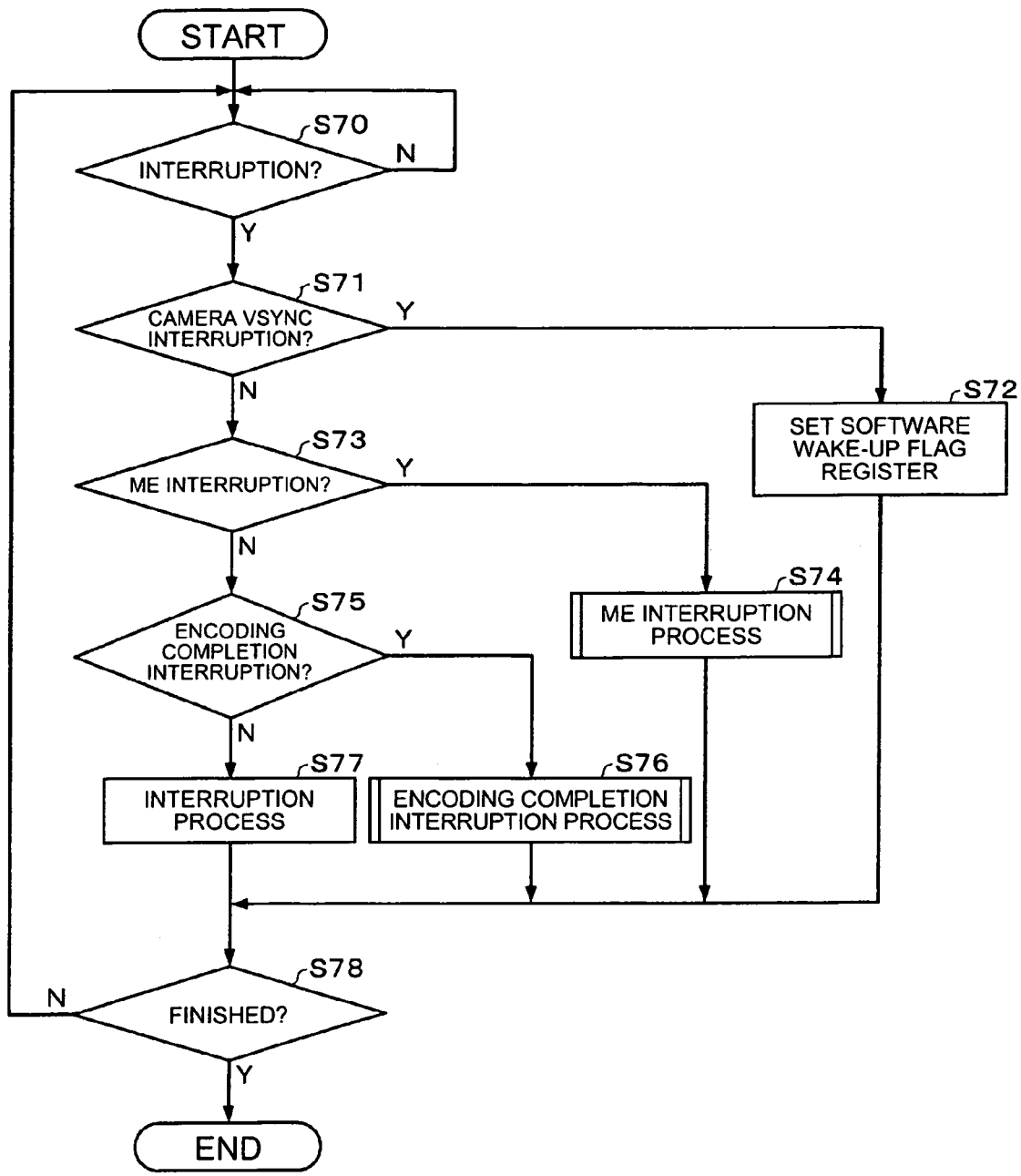
FIG. 26 is a flowchart of an example of an interruption accepting process executed by a host.

FIG. 26 shows an example of the flow of an interruption accepting process executed by the host 210. A program for realizing the process shown in FIG. 26 is stored in the memory 214. The CPU 212 realizes the process shown in FIG. 26 after retrieving the program.

Firstly, the CPU 212 is watching the interruption input. (step S70: N). And, if the CPU 212 detects the interruption (step S70: Y), it judges whether or not the interruption is the camera VSYNC interruption (step S71).

If the CPU 212 decides that it is the camera VSYNC interruption (step S71: Y), it executes a process of setting the software wake-up flag register 130 (step S72).

If the CPU 212 decides that it is not the camera VSYNC interruption in the step S71 (step S71: N), it judges whether or not it is an ME interruption described below (step S73).

If the CPU 212 decides that it is the ME interruption (step S73: Y), it executes the ME interruption process described below (step S74).

If the CPU 212 decides that it is not the ME interruption in the step S73 (step S73: N), the CPU 212 judges whether or not it is an encoding completion interruption described below (step S75). If the CPU 212 decides that it is the encoding completion interruption (step S75: Y), it executes the encoding completion interruption process described below (step S76).

If the CPU 212 decides that it is not the encoding completion interruption in the step S75 (step S75: N), it executes a predetermined interruption process (step S77).

Subsequently to the steps S72, S74, S76, or S77, if it should not be terminated (step S78: N), the process goes back to the step S70, and if it should be terminated (step S78: N), the series of processes is terminated (END).

Returning to FIG. 24, the explanation is continued therefrom. When the software wake-up flag register 130 is set by the host 210 via the host I/F 202, the encoding process is commenced in the encoding IC 200.

The motion estimating section 114 does not executes the motion estimation with respect to the input image data first accepted after commencement of encoding, but executes it after the input image data of the succeeding frame are accepted. Since the detail of the motion estimation is as described above, descriptions regarding the actions of the inverse-quantizing section 116 and so on are omitted here. When the motion estimation by the motion estimating section 114 is completed, the motion estimating section 114 notifies the host 210 via the host I/F 202 of a motion estimation completion interruption (ME interruption).

Figure 27:
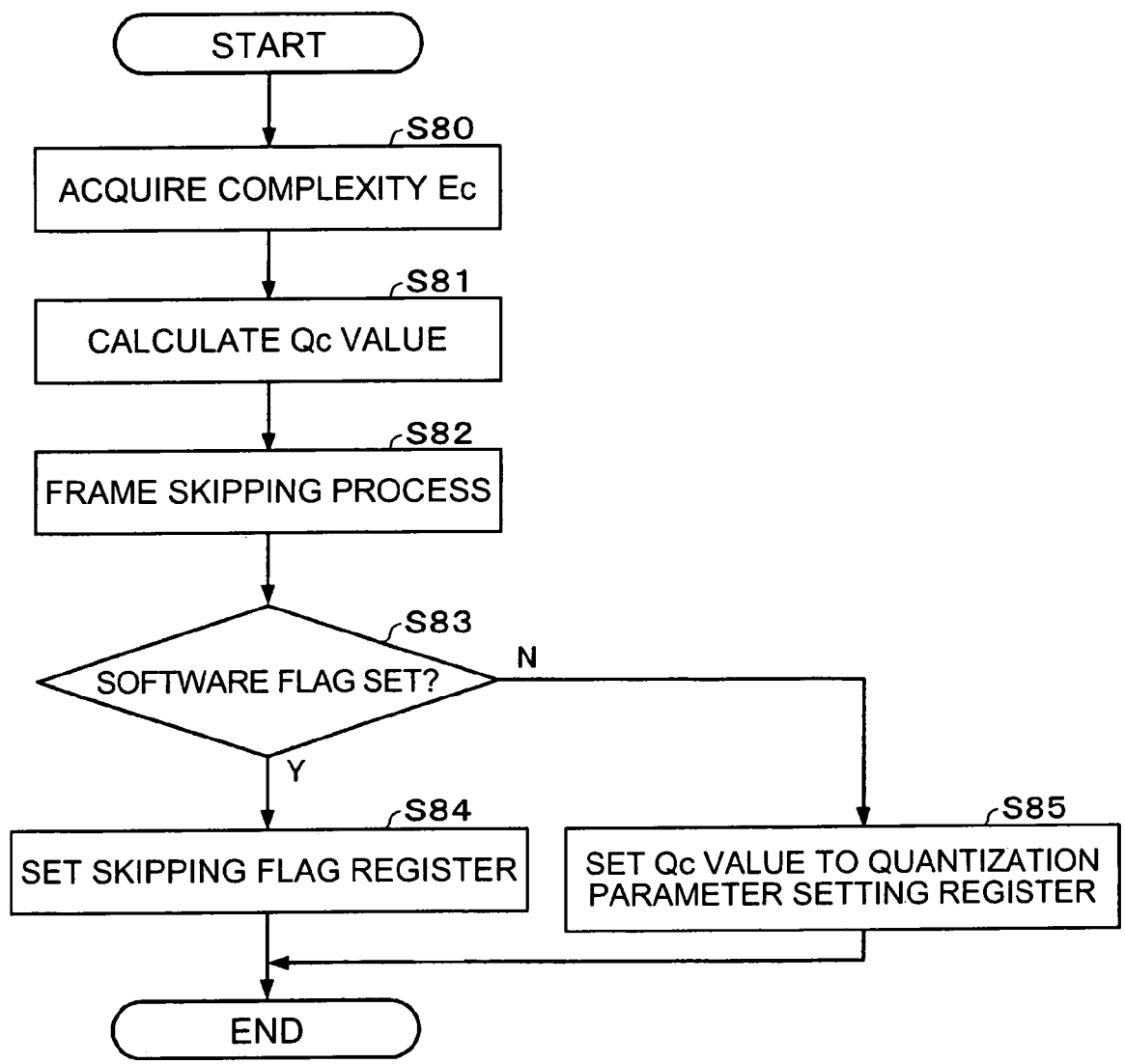
FIG. 27 is a flowchart of an example of an ME interruption process.

FIG. 27 shows an example of the flow of the ME interruption process. A program for realizing the process shown in FIG. 27 is stored in the memory 214. The CPU 212 realizes the process shown in FIG. 27 after retrieving the program.

The ME interruption process is executed in the step S74 of FIG. 26.

When the ME interruption is detected, the CPU 212 retrieves the complexity Ec generated by the motion estimating section 114 via the host I/F 202 (step S80). The complexity Ec is generated by the motion estimating section 114 along with the equation shown in FIG. 6.

Subsequently, the CPU 212 finds the quantization parameter Qc (step S81). More specifically, the CPU 212 finds the quantization parameter Qc as explained along FIGS. 15 through 19.

Then, the CPU 212 executes frame skipping process (step S82). The frame skipping process is a process described later in which, for example, the step of setting frame skipping (step S115) in FIG. 20 is a process for simply setting a software flag indicating that a decision of skipping the present frame is made.

After then, if the software flag is set as a result of the skipping process (step S83: Y), the CPU 212 sets the skipping flag register 132 via the host I/F 202 (step S84), and if the software flag is not set (step S83: N), it sets the value of the quantization parameter Qc found in the step S81 in the quantization parameter setting register 205 via the host I/F 202 (step S85).

After the step S84 or S85, the series of processes is terminated (END).

Figure 28:
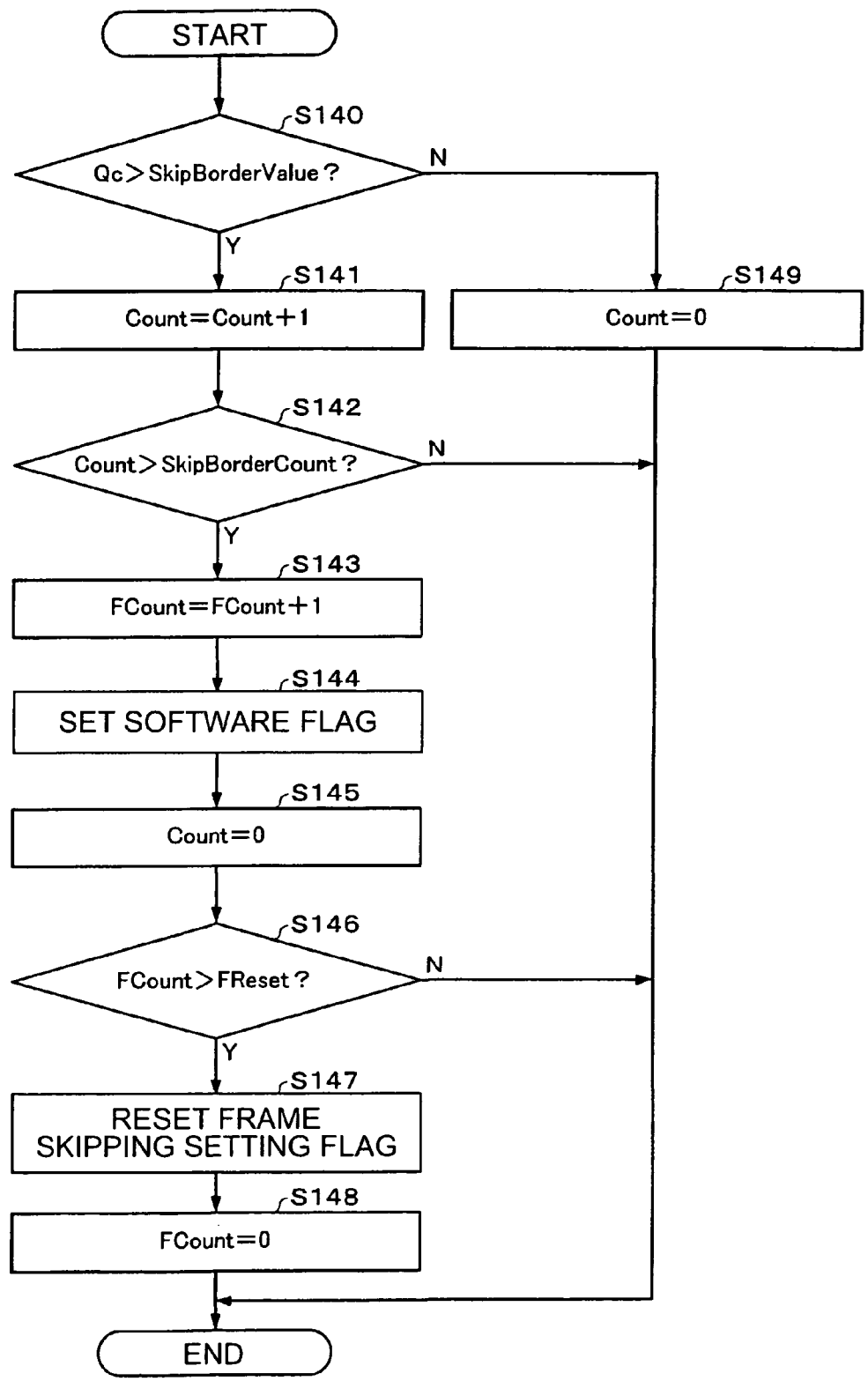
FIG. 28 is a flowchart of an example of a frame skipping process in FIG. 27.

FIG. 28 shows an example of the flow of the frame skipping process in the step S82 of FIG. 27. A program for realizing the process shown in FIG. 28 is stored in the memory 214. The CPU 212 realizes the process shown in FIG. 28 after retrieving the program.

In the frame skipping process, a frame skipping setting flag not shown is assumed to be set in the step S115 of FIG. 20.

Firstly, if the camera VSYNC interruption is detected, the CPU 212 judges whether or not the value of the quantization parameter Qc thus fund as described above is greater than a skipping threshold SkipBorderValue (step S140).

If the value of the quantization parameter Qc is decided to be greater than the skipping threshold SkipBorderValue in the step S140 (step S140: Y), Count, which is a variable value denoting the count, is incremented (step S141). The count value Count has been reset to 0 by initialization. Further, if the value of the quantization parameter Qc is decided to be no greater than the skipping threshold SkipBorderValue in the step S140 (step S140: N), the count value Count is initialized to 0 (step S149), the series of processes is terminated (END).

Subsequently to the step S141, whether or not the count value Count is greater than the skipping threshold SkipBorderCount is judged (step S142). The value of the skipping threshold SkipBorderCount is determined prior to the present process. And, if the count value Count is decided to be equal to or less than the skipping threshold SkipBorderCount (step S142: N), the process is terminated (END). By thus processed, even if the frame skipping setting flag is set, the skipping process is executed after at least one frame of interval. More specifically, the skipping process is executed with the interval of a number of frames corresponding to the skipping threshold SkipBorderCount.

If the count value Count is decided to be greater than the skipping threshold SkipBorderCount in the step S142 (step S142: Y), a frame count value FCount, which is a variable value, is incremented (step S143). The frame count value FCount has been reset to 0 by initialization.

After then, the CPU 212 sets a software flag (step S144), and set the count value Count to 0 (step S145).

Subsequently, whether or not the frame count value FCount is greater than a frame resetting value FReset is judged (step S146). The value of the frame resetting value FReset is set prior to the present process. And, if the frame count value FCount is decided to be equal to or less than the frame resetting value FReset (step S146: N), the series of processes is terminated (END).

If the frame count value FCount is decided to be greater than the frame resetting value FReset (step S146: Y), the frame skipping setting flag is reset (step S147), the frame count value FCount is set to 0 (step S148), the series of processes is terminated (END).

By thus processed, if the frame skipping setting flag is set, the skipping process is executed two or more times with at least one frame of interval. More specifically, the skipping process is executed a number of times corresponding to the frame resetting value FReset with the interval of a number of frames corresponding to the skipping threshold SkipBorderCount.

By thus processing as described above, the host 210 can execute the skipping process two or more times with at least one frame of interval.

Note that the threshold values SkipBorderValue and SkipBorderCount are set prior to the process shown in FIG. 28.

Returning to FIG. 24, the explanation is continued therefrom. In the encoding IC 200, when the skipping flag register 132 is set, the motion estimating section 114 is initialized to skip the image generation process of the present frame.

Meanwhile, since the value of the quantization parameter Qc is set to the quantization parameter register 206, the encoding IC 200 commences the process by the DCT section 112. And, as described above, in the quantizing section 20, the DCT coefficients (image data in a broad sense) generated by the DCT section 112 are quantized using the quantization parameter set in the quantization parameter setting register 206 and the quantization step values in the quantization table not shown. The quantized data, the results thereof, are written to the FIFO buffer section 30.

In this case, the FIFO access section 34 increments and updates the count data every time writing to the FIFO buffer section 30 occurs in the present frame. And, when writing of the quantized data to the FIFO buffer section 30 is completed, the FIFO section 208 notifies the host 210 of the encoding completion interruption indicating completion of encoding process for one frame via the host I/F 202.

Figure 29:
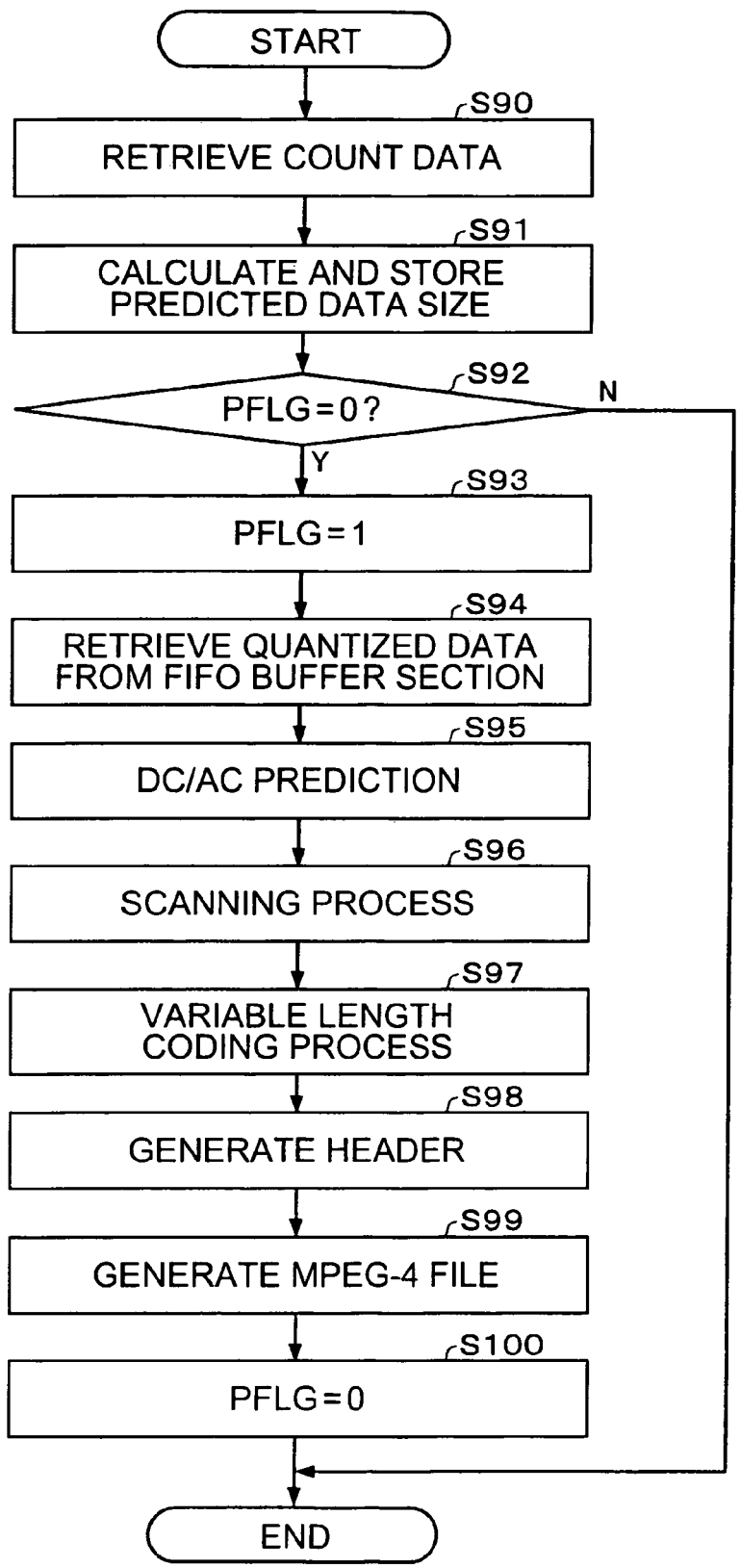
FIG. 29 is a flowchart of an example of an encoding completion interruption process.

FIG. 29 shows an example of the flow of the encoding interruption process. A program for realizing the process shown in FIG. 29 is stored in the memory 214. The CPU 212 realizes the process shown in FIG. 29 after retrieving the program.

The encoding interruption process is executed in the step S76 shown in FIG. 26.

Upon detection of the encoding interruption, the CPU 212 retrieves the count data stored in the count register 32 (step S90). Subsequently, as shown in FIG. 18, it finds the predicted data size yo with putting the count data retrieved in the step S90 to $x_0$, and then stores it in a predetermined temporary area (step S91).

And then, it judges whether or not a process execution flag PFLG is 0 (step S92). The process execution flag PFLG is a flag indicating whether or not the encoded data generation process (the process corresponding to the steps S7 through S9 in FIG. 1A) is under execution. If it decides that the process execution flag PFLG is not 0 (step S92: N), it judges that the process in the encoded data generating section 40 is under execution to terminate the series of processes (END).

If it decides that the process execution flag PFLG is 0 (step S92: Y), it executes the encoded data generation process.

In the encoded data generation process, the process execution flag PFLG is set to 1 before all (step S93). Thus, even if the encoding interruption is generated during the generation process is executed, execution of the encoded data generation process of the succeeding frame can be kept waiting.

And then, it retrieves the quantized data of one frame from the FIFO buffer section 30 by a predetermined number of bytes (step S94).

And, the CPU 212 executes, by a macro block, the DC/AC prediction process (step S95), the scan process (step S96), and the variable length coding process (step S97) to generate the encoded data.

Subsequently, the CPU 212 adds a macro block header to the encoded data generated in the step S97. The encoded data thus obtained are processed as much as 1 VOP (Video Object Plane, the GOV header and the VOP header are generated based on the quantization parameter already found (step S98), and after encoding of a predetermined number of frames is completed, the result is output as an MPEG-4 file (step S99).

And, subsequently to the step S99, the process execution flag PFLG is set to 0 (step S100), the series of processes is terminated (END).

As described above, the image data compression process is executed by being assigned to the hardware processing section 110 and the software processing section 150.

In order for executing the rate control of the encoding IC 200 described above, in the present embodiment, the host 210 stores a processing equation for executing the following linear transformation to carry out the rate control described above.

Figure 30:
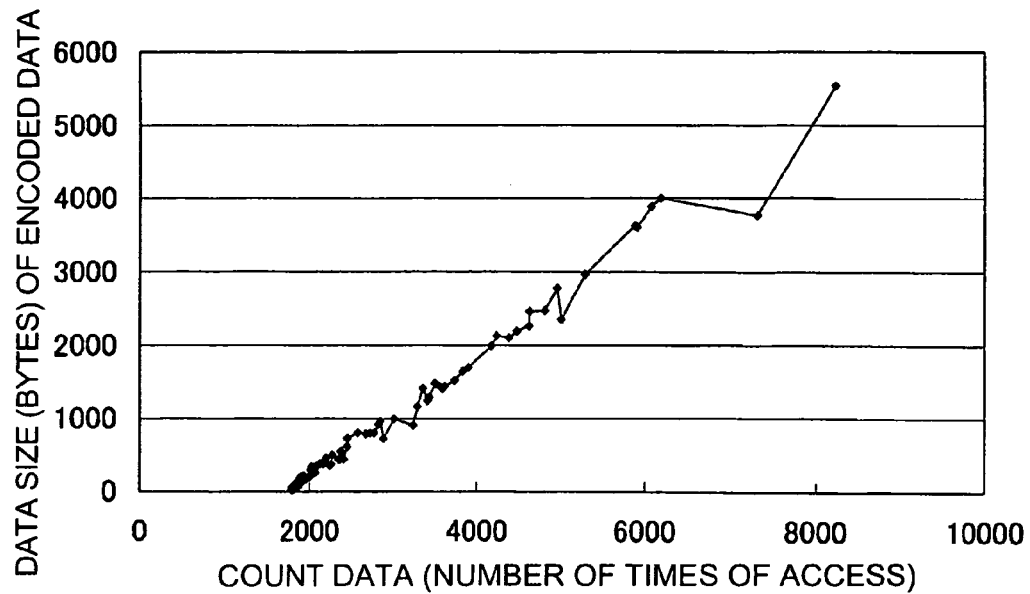
FIG. 30 is a chart showing a relationship between count data and the predicted data size in the present embodiment.

FIG. 30 shows a correlation chart between the count data and the predicted data size.

In this case, assuming that the bit rate is 64 kilo bit per second (bps), the frame rate is 15 frames per second (fps), and the size of the image QCIF (176×144 pixels), the horizontal axis denotes the count data representing the number of times of access to the FIFO buffer section 30, and the vertical axis denotes actual measurement of the data size (number of bytes) of the encoded data after VLC encoding.

As shown, it can be understood that there is a linear relationship between the count data and the data size.

According to the actual measurement shown in FIG. 30, the linear relationship shown in FIG. 30 can approximately be expressed by, for example, substituting a with ⅘, and b with (13.5625×99×8) in the equation (1). Accordingly, the predicted data size can easily be found by using the linear transform equation.

3.5 Advantages

Hereinafter advantages of the present embodiment are explained in comparison with a comparative example to the present embodiment. If the image data compression process described above is shared by hardware and software, the FIFO buffer section 30 for adjusting execution efficiencies of the both is required. In this case, as a comparative example capable of realizing the rate control method described above, it can be considered that, different from the present embodiment, the quantization step is changed based on the data size of the encoded data of a number of precedent frames.

Figure 31:
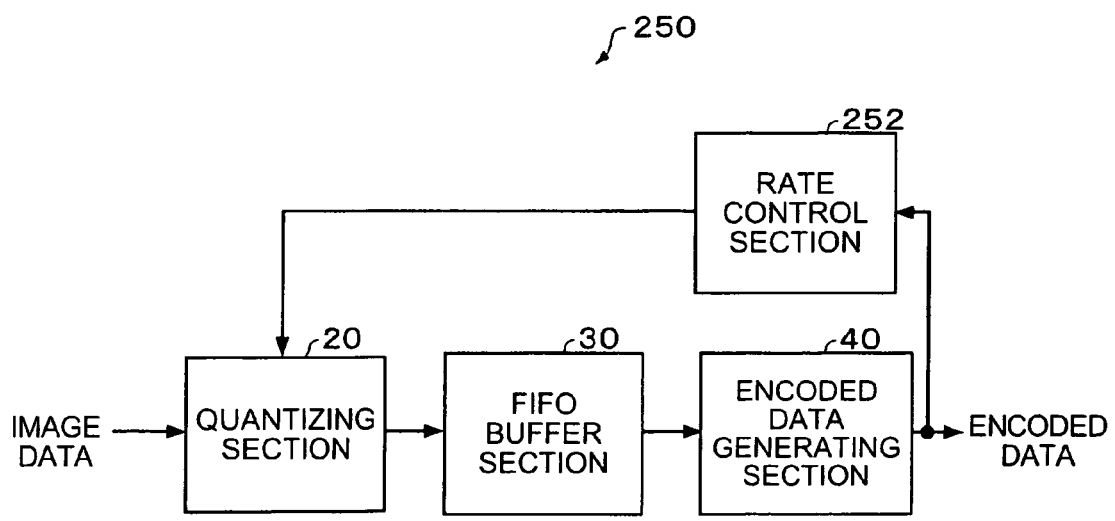
FIG. 31 is a block diagram of a schematic configuration of an image data compression device according to a comparative example to the present embodiment.

FIG. 31 shows a schematic block diagram of the configuration of the image data compression device according to the comparative example to the present embodiment. In the image compression device 250 of the comparative example, the same parts as those of the image data compression device 10 of the present embodiment shown in FIG. 8 are denoted with the same reference numerals and explanations therefor are omitted if appropriate.

In contrast to the image data compression device of the present embodiment, in the image data compression device 250 of the comparative example, a rate control section 252 is arranged to change the quantization step of the quantizing section 20 based on an average data size of encoded data of N (N is an integer greater than 1.) frames.

Namely, in the comparative example, the rate control section 252 averages the data size of the encoded data of each frame in the preceding N frames of the frame corresponding to the image data to be quantized by the quantizing section 20 to find the average data size, and changes the quantization step based on the average data size. For example, when the image data to be quantized by the quantizing section 20 is corresponding to the Lth frame (L is a positive integer), the rate control section 252 changes the quantization step based on the average data size found by averaging the data sizes of the encoded data of N frames preceding the Lth frame, namely from the (L−P)th frame (where L>P, P is a positive integer.) to the (L−P−N+1)th frame (where L−P>N−1).

Figure 32:
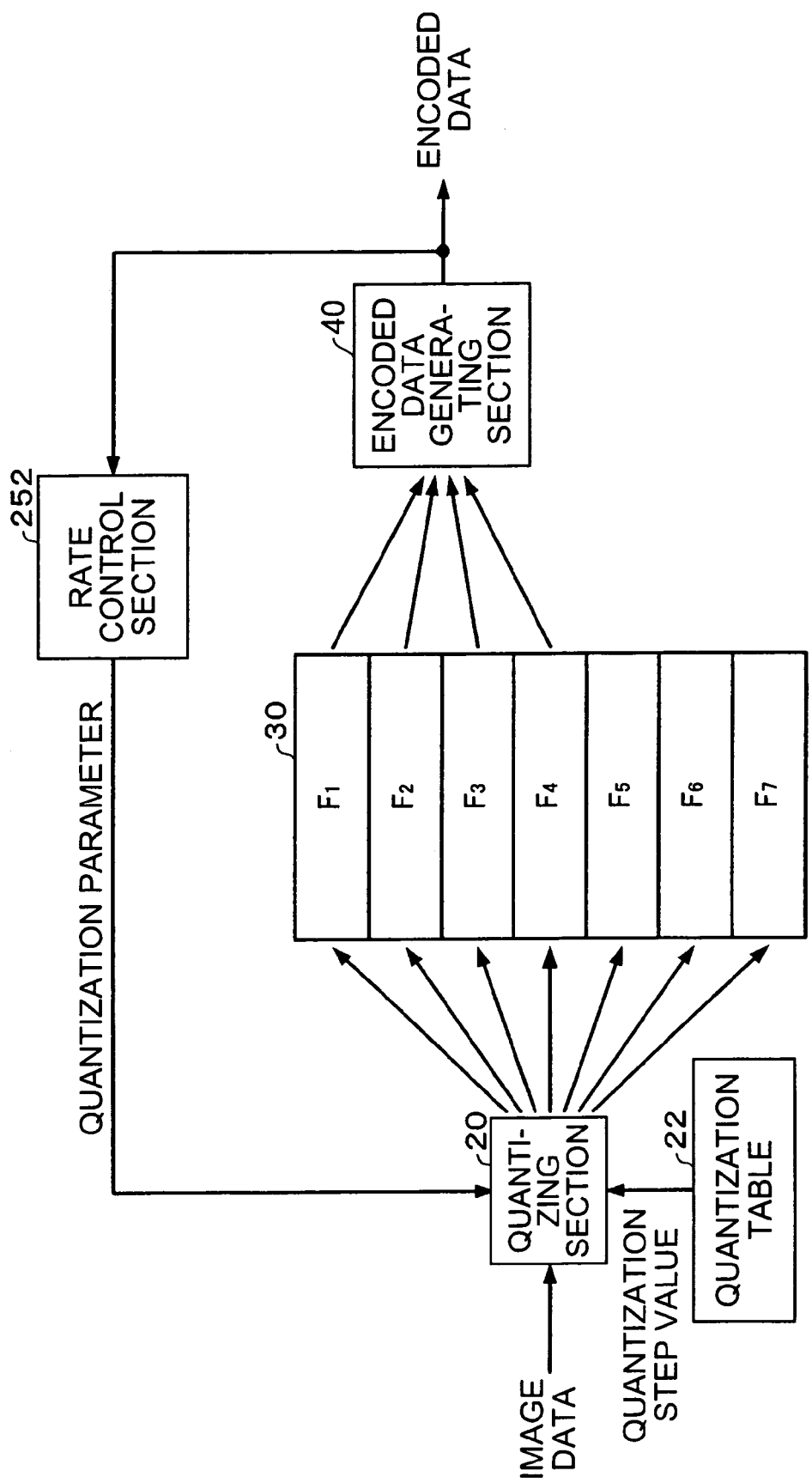
FIG. 32 is a diagram for explaining a rate control method according to the comparative example.

FIG. 32 shows a diagram for explaining the method of the rate control according to the comparative example. Note that the same parts as those of the image data compression device 250 shown in FIG. 31 are denoted with the same reference numerals and explanations therefor are omitted if appropriate.

Figure 33:
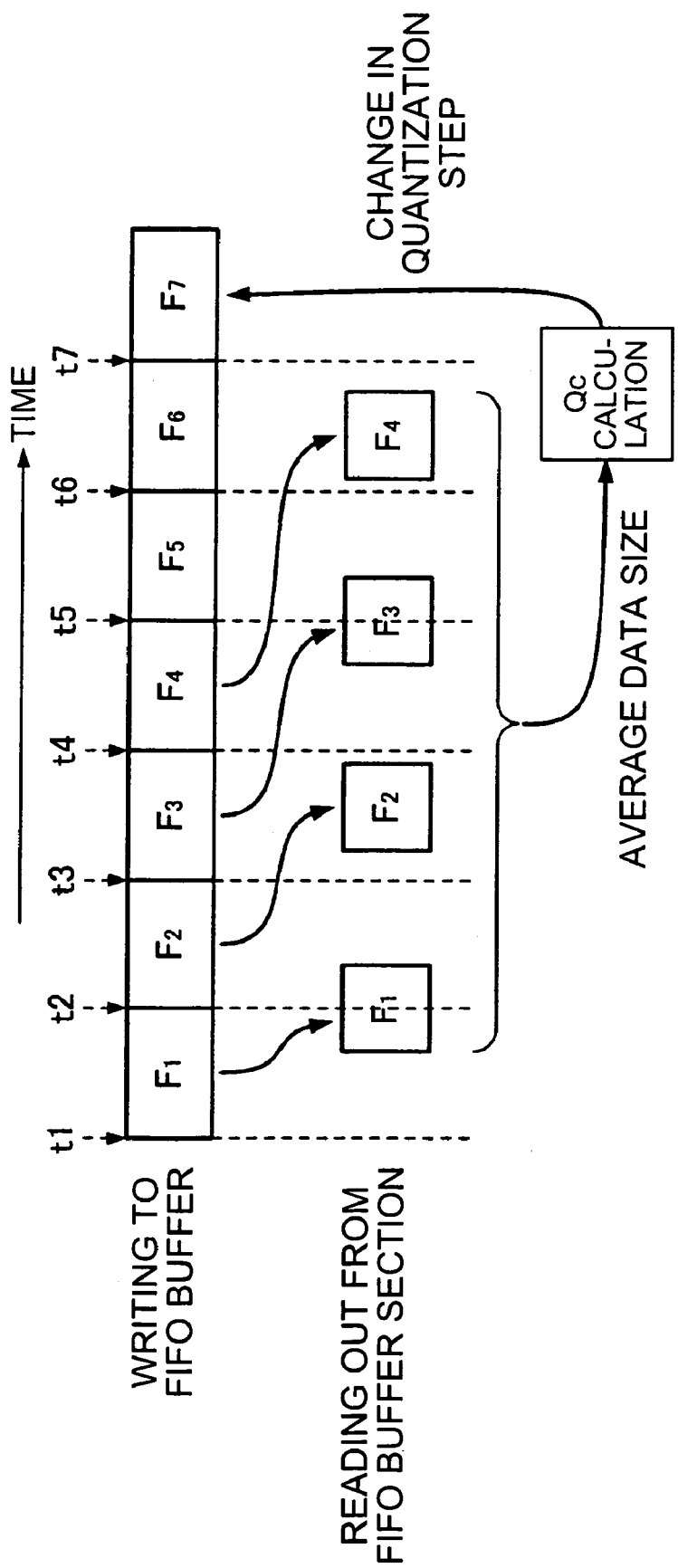
FIG. 33 is a schematic diagram of operational timing of the rate control method shown in FIG. 32.

FIG. 33 shows a schematic diagram of the operational timing of the rate control method shown in FIG. 32.

The quantizing section 20 quantizes the image data by a frame at time points of t1, t2, and so on, and then writes the quantized data to the FIFO buffer section 30 in the order of a first frame $F_1$, a second frame $F_2$, and so on. The encoded data generating section 40 retrieves the quantized data from the FIFO buffer section 30 by a frame asynchronously with the writing timing of the quantized data to the FIFO buffer section 30 to execute encoding process.

And, the rate control section 252 changes the quantization step of the quantizing section 20 based on the average data size found by averaging the data size of the encoded data of each of, for example, four frames (N=4) preceding the frame (the present frame) whose image data is to be quantized by the quantizing section 20. Thus, the size of the quantized data quantized by the quantizing section 20 changes, and consequently, the size of the encoded data generated by the encoded data generating section 40 also changes.

In FIG. 33, the encoded data generating section 40 sequentially retrieves the quantized data of a first through a fourth frames $F_1$ through $F_4$ from the FIFO buffer section 30, and generates and then outputs the encoded data of each of the frames. In this case, the quantizing section 20 is assumed to execute the quantization of the image data of the 7th frame $F_7$.

The rate control section 252 stores each size of the encoded data of respective one of the first through fourth frames $F_1$ through $F_4$, and finds the average value of the sizes of the encoded data of the respective frames out of the first through the fourth frames $F_1$ through $F_4$ as the average data size. And then, as explained in relation to FIGS. 6 and 7, the rate control section 252 calculates an amount of codes used for encoding the seventh frame $F_7$ using the average data size to find the quantization parameter Qc. As a result, the quantizing section 20 quantizes the image data of the seventh frame $F_7$ using the product of the quantization step values in the quantization table 22 and the quantization parameter Qc found in accordance with the average value of the data sizes of the encoded data of the first through the fourth frames $F_1$ through $F_4$. The quantization results are written to the FIFO buffer section 30. Thus, the encoded data can be generated at a desired rate.

Here, the alterations of the free areas in VBV buffers provided to the image data compression devices according to the comparative example and the present embodiment are compared with each other.

Figure 34:
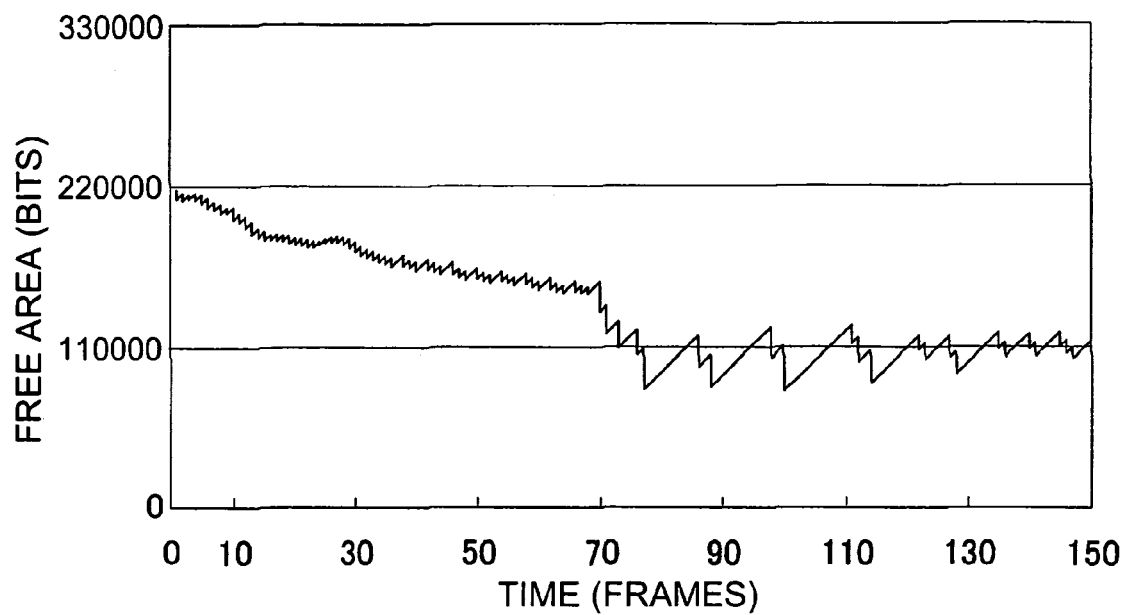
FIG. 34 is a chart showing the alteration of a free area in a VBV buffer in the comparative example.

FIG. 34 shows a simulation result illustrating an example of the alteration of the free area in the VBV buffer provided to the image data compression device 250 according to the comparative example.

Figure 35:
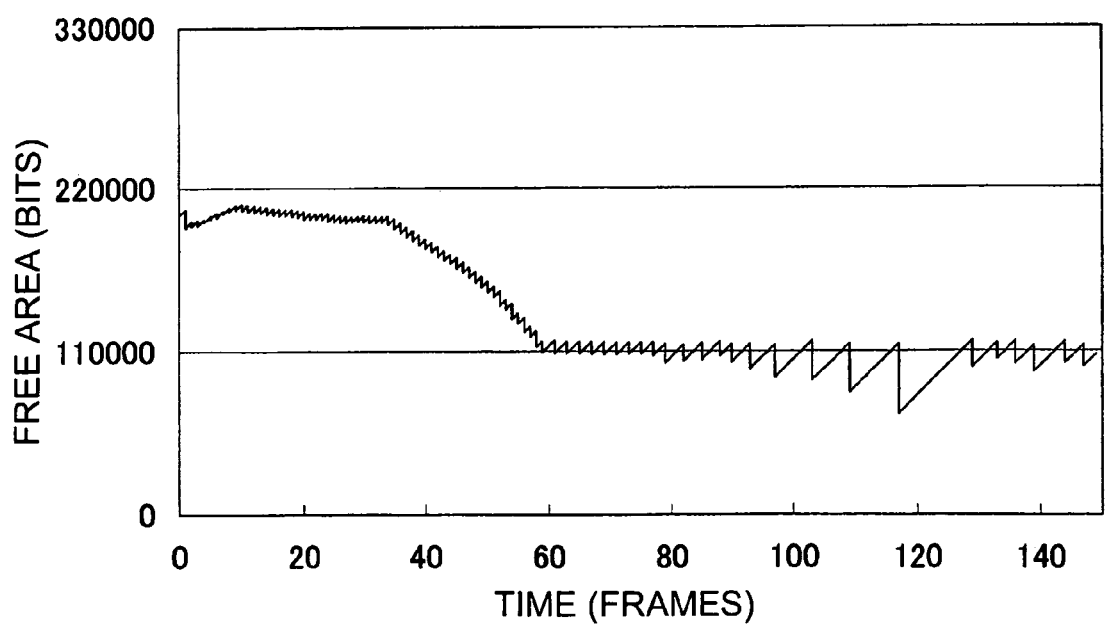
FIG. 35 is a chart showing the alteration of the free area in the VBV buffer in the present embodiment.

FIG. 35 shows a simulation result illustrating an example of the alteration of the free area in the VBV buffer provided to the image data compression device 10 according to the present embodiment.

In FIGS. 34 and 35, the horizontal axis denotes the number of frames, and the vertical axis denotes the number of bits of the free area in the VBV buffer.

Here, since the encoded data is generated so that the VBV buffer does not overflow nor underflow, if the free area of the VBV buffer becomes less than a predetermined threshold (about 110000 bits), the frame skipping process is executed. It shows that, at the timing the free area decreases, the encoding process is executed in the corresponding frame. Further, it shows that, at the timing the free area increases, the result of the encoding process is not output to the VBV buffer. By thus generating the encoded data so as to maintain a predetermined amount of the free area, the constant rate is realized.

In FIGS. 34 and 35, it is assumed that the total number of frames is 150, the bit rate is 64 kilo bit per second (kbps), the frame rate is 15 frames per second (fps), the size of the VBV buffer is 327680 bits, the threshold is 109226 bits, and the average data size of encoded data corresponding to four preceding frames is used in the comparative example. Under such conditions, FIGS. 32 and 33 show the simulation results when the image data of the moving images, which is slow at beginning, and then gradually becomes faster, is encoded.

In the comparative example shown in FIG. 34, focusing on around the threshold of 109226 bits, it can be read that the encoding process is continued despite the free area becomes less than the threshold, thus indicating that the accuracy of the rate control for realizing the constant rate is not so high. This is because the average data size of the preceding four frames is used, and accordingly, the frame affected by the result of the rate control is delayed for one or two frames.

On the contrary, in the present embodiment shown in FIG. 35, the free area is maintained to be in the vicinity of the threshold. This means that the accuracy of the prediction of the predicted data size is high. Namely, it means that the accuracy is high, with which the predicted data size is found by executing the linear transform on the number of times of writing to the FIFO buffer section 30 in the precedent frame, and it also means that the accuracy of bit rate control based on the predicted data size is high. Therefore, it can be understand that, in comparison with the comparative example, the provability of causing the overflow of the VBV buffer is also low in the present embodiment.

4. Display Controller

The function of the encoding IC according to the present embodiment can be applied to a display controller.

Figure 36:
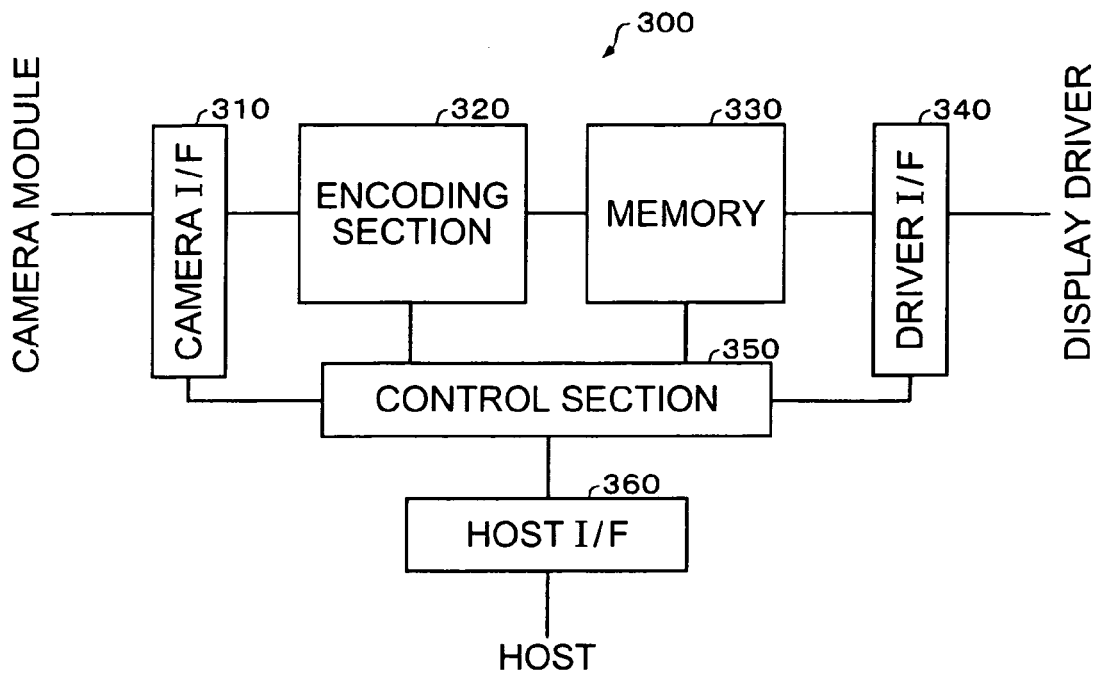
FIG. 36 is a block diagram of a configuration example of a display controller in the present embodiment.

FIG. 36 shows a block diagram of a configuration example of a display controller according to the present embodiment.

A display controller 300 includes a camera I/F 310, an encoding processing section 320, a memory 330, a driver I/F 340, a control section 350, and a host 360.

The camera I/F 310 is connected to a camera module not shown in the drawings. The camera module outputs the input image data of picked-up moving images in the YUV format as well as a synchronization signal (e.g., a VSYNC signal) for designating the ends of one frame. The camera I/F 310 executes an interfacing process for receiving the image data of moving images generated by the camera module.

The encoding processing section 320 is obtained by omitting the functions of the host I/F 202 and the camera I/F 204 from the encoding IC 200 shown in FIG. 24. Namely, the encoding processing section 320 comprises the functions of each of the quantizing section 20, the FIFO section 208, the DCT section 112, the motion estimating section 114, the inverse-quantizing section 116, the inverse-DCT section 118, the motion compensating section 120, the quantization parameter setting register 206, the software wake-up flag register 130, and the skipping flag register 132 shown in FIG. 24.

The memory 330 stores the encoded data which is the output of the encoding processing section 320. Further, the memory 330 also stores image data to be displayed on the display panel, and the driver I/F 340 retrieves the image data from the memory 330 with a predetermined period to supply the image data to a display driver for driving the display panel. The driver I/F 340 executes an interfacing process for transmitting the image data to the display driver.

The control section 350 handles a control of the camera I/F 310, the encoding processing section 320, the memory 330, and the driver I/F 340. The control section 350 executes a process of receiving the input image data from the camera module, a process of encoding the input image, a process of writing the encoded data to the memory 330, a process of retrieving the image data for displaying from the memory 330, and a process of transmitting the image data to the display driver, for example, along with instructions received from a host not shown via the host I/F 360.

Figure 37:
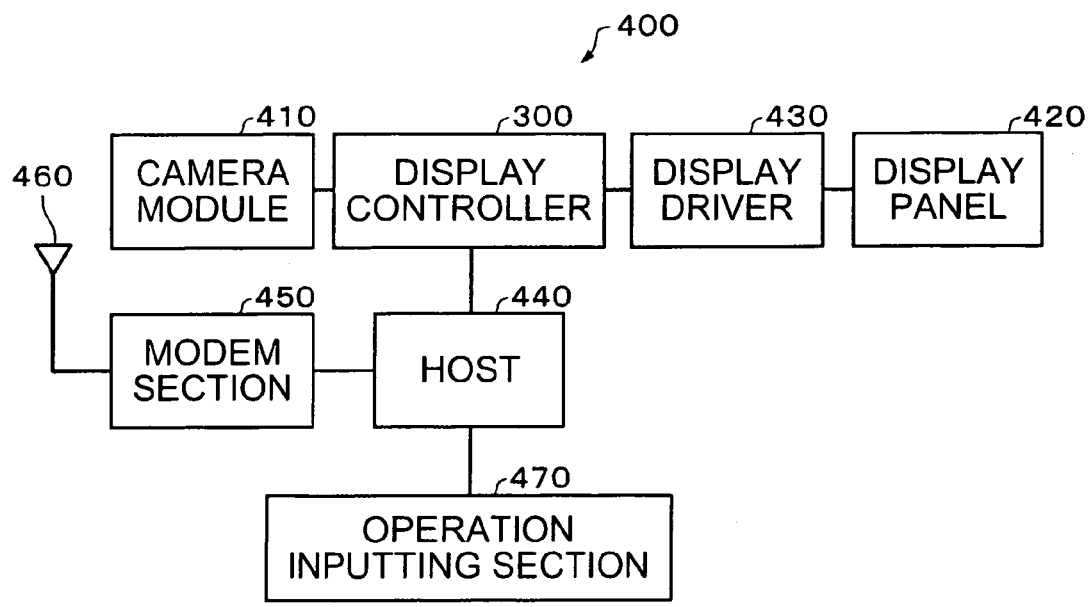
FIG. 37 is a block diagram of a configuration example of an electronic instrument applying the display controller of FIG. 36.

FIG. 37 shows a block diagram of a configuration example of an electronic instrument applying the display controller shown in FIG. 36. Here, a block diagram of a configuration example of a mobile phone as the electronic instrument. Note that, the same parts as those in FIG. 36 are denoted with the same reference numerals and explanations therefor are omitted if appropriate.

The mobile phone 400 includes a camera module 410. The camera module 410 includes a CCD (Charge-Coupled device) camera, and supplies the display controller 300 with image data picked-up by the CCD camera in the YUV format.

The mobile phone 400 includes a display panel 420. A liquid crystal display panel can be adopted as the display panel 420. In this case, the display panel 420 is driven by a display driver 430. The display panel 420 includes a plurality of scanning lines, a plurality of data lines, and a plurality of pixels. The display driver 430 has a function of a scanning driver for selecting the scanning line(s) from the plurality of scanning lines in increments of one or more of scanning lines, as well as a function of a data driver for supplying the data lines with voltages corresponding to image data.

The display controller 300 is connected to the display driver 430, and supplies the display driver 430 with image data.

A host 440 is connected to the display controller 300. The host 440 controls the display controller 300. Further, the host 440 can supply the display controller 300 with the image data received via an antenna 460 and then demodulated by a modem section 450. The display controller 300 make the display panel 420 display based on the image data via the display driver 430.

Further, the host 440 has a function of the host 210 shown in FIG. 24. After the image data generated by the camera module 410 are encoded by the encoding processing section 320, and then modulated by the modem section 450, the host 440 can instruct to transmit them to another communication device via the antenna 460. In this case, the display controller 300 can encode the image data generated by the camera module 410, and then output encoded data obtained by encoding to the host 440.

The host 440 executes a process of transmitting or receiving image data based on the operation information from an operation inputting section 470, the encoding process, image picking-up by the camera module 410, and a process of displaying on the display panel.

Note that, although the liquid crystal display panel is described as an example of the display panel 420 in FIG. 37, it is not so limited. The display panel 420 can be an electroluminescence or a plasma display device, and it can be applied to the display controller for supplying the image data to the display drivers for driving these panels.

Note that the present invention is not limited to the embodiment described above, but can be put into practice with various modification within the scope or the spirit of the present invention.

Further, in the aspects of the present invention corresponding to the dependent claims, configurations lack a part of elements of the independent claim can also be adopted. Further, a substantial part of one independent claim can be dependent from another independent claim.

What is claimed is:

1. An image data compression device, comprising:
   a quantizing section for quantizing image data with a quantization step changing in accordance with a quantization parameter;
   a FIFO buffer section for buffering the quantized data corresponding to a plurality of frames and quantized by the quantizing section;
   an encoded data generating section for generating encoded data obtained by encoding the quantized data after reading the quantized data out of the FIFO buffer section asynchronously with writing to the FIFO buffer section; and
   a rate control section for controlling a data size of the encoded data by changing the quantization step of the quantizing section for each frame, wherein
   the rate control section finds a predicted data size of the encoded data for the precedent frame from a data size of the quantized data for the precedent frame to the present frame,
   sets or releases an upper limit threshold of the quantization parameter based on the number of assignable bits assignable to a compressing process in order for maintaining a predetermined bit rate, or the number of remaining frames, or both the number of the assignable bits and the number of the remaining frames,
   finds the quantization parameter so as to be equal to or less than the upper limit threshold of the quantization parameter using the predicted data size when setting the upper limit threshold of the quantization parameter, and
   finds the quantization parameter irrespective of the upper limit threshold of the quantization parameter using the predicted data size when releasing the upper limit threshold of the quantization parameter.

2. The image data compression device according to claim 1,
   further comprising a frame skipping section for executing a skipping process of skipping a generating process of the image data to be supplied to the quantizing section, wherein
   the frame skipping section executes the skipping process when the upper limit threshold of the quantization parameter is released.

3. The image data compression device according to claim 2, wherein
   the frame skipping section executes the skipping process two or more times with at least one frame of interval.

4. The image data compression device according to claim 1, wherein
   the rate control section compares each reference bit number of various kinds of reference bit numbers defined within the range of the maximum encoding size for maintaining the bit rate with the number of the remaining assignable bits,
   compares each reference frame number of various kinds of reference frame numbers defined within the range of encoded frame number for maintaining the bit rate with the number of the remaining frames, and
   sets or releases the upper limit threshold of the quantization parameter based on the result of comparison of each of the reference bit numbers with the number of the assignable bits and the result of comparison of each of the reference frame numbers with the number of the remaining frames.

5. The image data compression device according to claim 1, wherein
   the rate control section, when setting the upper limit threshold of the quantization parameter, finds the quantization parameter so as to be equal to or less than the upper limit threshold of the quantization parameter and equal to or greater than a settable lower limit threshold of the quantization parameter using the predicted data size.

6. The image data compression device according to claim 1, wherein
   the rate control section, if a settable lower limit threshold of the quantization parameter is set, finds the quantization parameter so as to be equal to or less than the upper limit threshold of the quantization parameter and equal to or greater than the lower limit threshold of the quantization parameter using the predicted data size, when releasing the upper limit threshold of the quantization parameter, further releases the lower limit threshold of the quantization parameter, and finds the quantization parameter using the predicted data size irrespective of the upper limit threshold of the quantization parameter or the lower limit threshold of the quantization parameter.

7. The image data compression device according to claim 1, further comprising:

a count register for holding a count data corresponding to the number of times of access to the FIFO buffer section, wherein the rate control section finds the predicted data size from the count data, and changes the quantization step based on the predicted data size.

8. The image data compression device according to claim 1, wherein the predicted data size is a data size which can be found by linear-transforming a data size of the quantized data for the precedent frame.

9. The image data compression device according to claim 8, wherein the linear transformation is a transformation using a coefficient corresponding to encoding efficiency of the encoded data generating section.

10. The image data compression device according to claim 9, wherein the linear transformation is a transformation in which a correction corresponding to the size of the header added to the encoded data is executed.

11. The image data compression device according to claim 1, further comprising:

a quantization table for storing the value of the quantization step, wherein the rate control section changes the quantization step by executing the quantization using the product of the quantization parameter and the value of the quantization step.

12. The image data compression device according to claim 1, further comprising:

a discrete cosine transforming section for supplying the quantizing section with the discrete-cosine-transformed image data by a frame.

13. The image data compression device according to claim 1, further comprising:

a hardware processing section for processing the image data of moving images by hardware; and a software processing section for generating the encoded data by encoding by software the quantized data read out of the FIFO buffer section, wherein the hardware processing section includes the quantizing section and the FIFO buffer section, and the software processing section includes the encoded data generating section and the rate control section.

14. The image data compression device according to claim 13, wherein the hardware processing section outputs the difference between the input image data for the present frame and a precedent image data for the precedent frame to the present frame as motion vector information, outputs the image data obtained by executing the discrete cosine transformation on the motion vector information to the quantizing section, and generating the precedent image data based on inverse-quantized data obtained by inverse-quantizing the quantized data with the quantization step.

15. The image data compression device according to claim 14, wherein the software processing section encodes the quantized data read out from the FIFO buffer section to variable length codes.

16. The image data compression device according to claim 15, wherein the software processing section executes a scanning process for reordering the quantized data read out from the FIFO buffer section, and then encodes the result of the scanning process to the variable length codes.

17. The image data compression device according to claim 16, wherein the software processing section executes a scanning process for finding a DC component and an AC component from the quantized data read out from the FIFO buffer section and then reordering the DC component and the AC component, and then encodes the result of the scanning process to the variable length codes.

18. An encoder for executing image data compression process, comprising:

an image input interface for executing an interfacing process for inputting image data;

a quantizing section for quantizing the image data with a quantization step changing in accordance with a quantization parameter;

a FIFO buffer section for buffering the quantized data corresponding to a plurality of frames and quantized by the quantizing section; and a host interface for executing an interfacing process with a host which reads out the quantized data stored in the FIFO buffer section asynchronously with writing to the FIFO buffer section, wherein the host finds a predicted data size of the encoded data for the precedent frame from the data size of the quantized data for the precedent frame to the present frame, sets or releases an upper limit threshold of the quantization parameter based on the number of assignable bits assignable to a compressing process in order for maintaining a predetermined bit rate, or the number of remaining frames, or both the number of the assignable bits and the number of the remaining frames, finds the quantization parameter so as to be equal to or less than the upper limit threshold of the quantization parameter using the predicted data size when setting the upper limit threshold of the quantization parameter, and finds the quantization parameter irrespective of the upper limit threshold of the quantization parameter using the predicted data size when releasing the upper limit threshold of the quantization parameter, and the quantizing section changes the quantization step based on the quantization parameter found by the host.

19. The encoder according to claim 18, further comprising a skipping flag register for skipping a generating process of the image data, wherein the host finds the quantization parameter so as to be equal to or less than the upper limit threshold of the quantization parameter using the predicted data size when setting the upper limit threshold of the quantization parameter, finds the quantization parameter irrespective of the upper limit threshold of the quantization parameter using the predicted data size and sets the skipping flag register when releasing the upper limit threshold of the quantization parameter, and if the skipping flag register is set, the image data generating process for the present frame is skipped.

20. The encoder according to claim 19, wherein
the host sets the skipping flag register two or more times with at least one frame of interval when releasing the upper limit threshold of the quantization parameter.

21. The encoder according to claim 18, wherein
if a settable lower limit threshold of the quantization parameter is set,
the host finds the quantization parameter using the predicted data size so as to be equal to or less than the upper limit threshold of the quantization parameter and equal to or greater than the lower limit threshold of the quantization parameter,
when releasing the upper limit threshold of the quantization parameter, further releases the lower limit threshold of the quantization parameter, and finds the quantization parameter using the predicted data size irrespective of the upper limit threshold of the quantization parameter or the lower limit threshold of the quantization parameter.

* * * * *